United States Patent
Wu et al.

(10) Patent No.: US 11,810,256 B2
(45) Date of Patent: Nov. 7, 2023

(54) IMAGE MODIFICATION TECHNIQUES

(71) Applicant: QUALCOMM Incorporated, San Diego, CA (US)

(72) Inventors: Meng-Lin Wu, San Diego, CA (US); Chung-Chi Tsai, San Diego, CA (US); An Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 17/524,681

(22) Filed: Nov. 11, 2021

(65) Prior Publication Data
US 2023/0143034 A1 May 11, 2023

(51) Int. Cl.
| | | |
|---|---|---|
| *G06T 17/20* | (2006.01) | |
| *G06T 7/50* | (2017.01) | |
| *G06T 7/11* | (2017.01) | |
| *G06T 3/20* | (2006.01) | |
| *G06T 3/40* | (2006.01) | |

(Continued)

(52) U.S. Cl.
CPC ............. *G06T 17/205* (2013.01); *G06T 3/20* (2013.01); *G06T 3/40* (2013.01); *G06T 3/60* (2013.01); *G06T 7/11* (2017.01); *G06T 7/50* (2017.01); *G06T 19/20* (2013.01); *G06T 2219/2016* (2013.01)

(58) Field of Classification Search
CPC .......... G06T 17/205; G06T 3/20; G06T 3/40; G06T 3/60; G06T 7/11; G06T 7/50; G06T 19/20; G06T 2219/2016; G06T 11/00; G06T 17/00; G06T 2207/10024; G06T 2207/10028; G06T 2207/20084; G06T 2207/20104; G06T 2207/30201
See application file for complete search history.

(56) References Cited

U.S. PATENT DOCUMENTS

| | | | |
|---|---|---|---|
| 2004/0190775 A1* | 9/2004 | Miller | .................. G06V 10/772 |
| | | | 382/103 |
| 2013/0016098 A1* | 1/2013 | Addessi | .................. G06T 19/20 |
| | | | 345/420 |

(Continued)

FOREIGN PATENT DOCUMENTS

WO  2021027585 A1  2/2021

OTHER PUBLICATIONS

International Search Report and Written Opinion—PCT/US2022/075654—ISA/EPO—dated Dec. 20, 2022.

Primary Examiner — Michael Le
(74) Attorney, Agent, or Firm — Polsinelli/Qualcomm

(57) ABSTRACT

Systems and techniques are described herein for modifying the scale and/or position of objects in images. For instance, a system can obtain a two-dimensional (2D) input image from a camera and a three-dimensional (3D) representation of the 2D input image. The system can further determine a first portion of the 3D representation of the 2D input image corresponding to a target object in the 2D input image. The system can adjust a pose of the first portion of the 3D representation of the 2D input image corresponding to the target object. The system can further generate a 2D output image having a modified version of the target object based on the adjusted pose of the first portion of the 3D representation of the 2D input image corresponding to the target object to be output on a display.

30 Claims, 23 Drawing Sheets

(51) Int. Cl.
*G06T 3/60* (2006.01)
*G06T 19/20* (2011.01)

(56) References Cited

U.S. PATENT DOCUMENTS

| | | | |
|---|---|---|---|
| 2015/0213646 | A1* | 7/2015 | Ma .......................... G06T 7/50 |
| | | | 345/420 |
| 2016/0328856 | A1* | 11/2016 | Mannino .................. G06T 7/73 |
| 2018/0174299 | A1* | 6/2018 | Agrawal ............. H04N 13/106 |
| 2019/0122376 | A1* | 4/2019 | Xi ............................ G06T 7/37 |
| 2019/0147221 | A1* | 5/2019 | Grabner ............... G06T 19/006 |
| | | | 382/103 |
| 2020/0211294 | A1* | 7/2020 | Fukuda .................... G06T 7/33 |
| 2021/0358144 | A1* | 11/2021 | Shanmuganathan ....................... |
| | | | G06V 20/647 |
| 2022/0292772 | A1* | 9/2022 | Wang ...................... G06N 3/08 |
| 2022/0292773 | A1* | 9/2022 | Liu ..................... G06N 3/0895 |

* cited by examiner

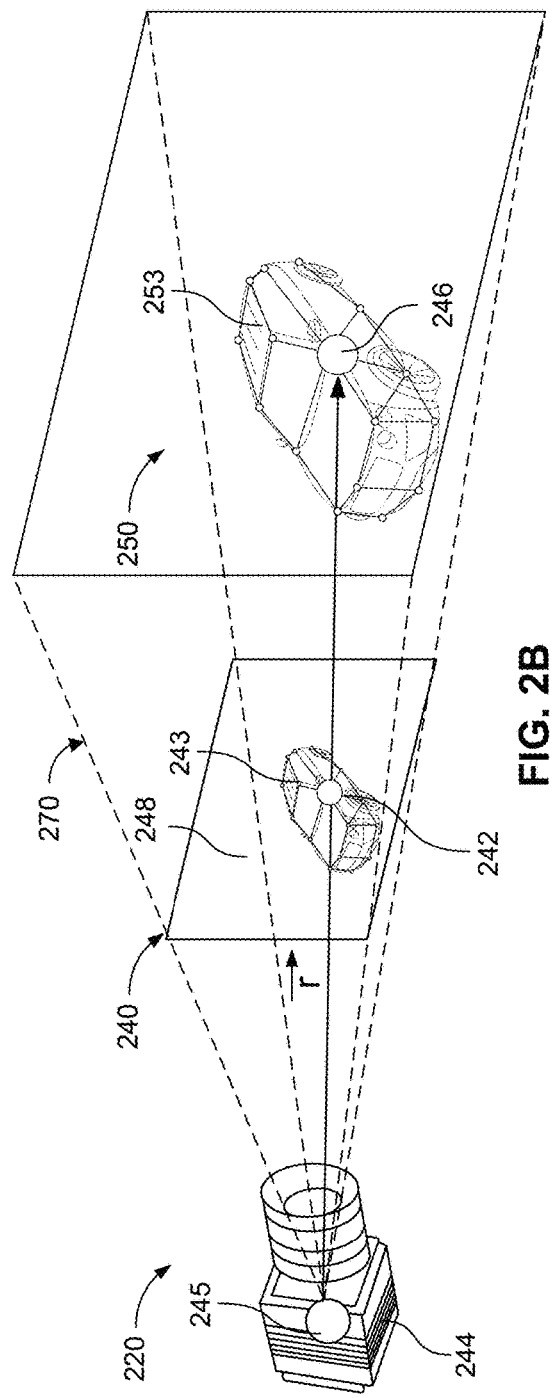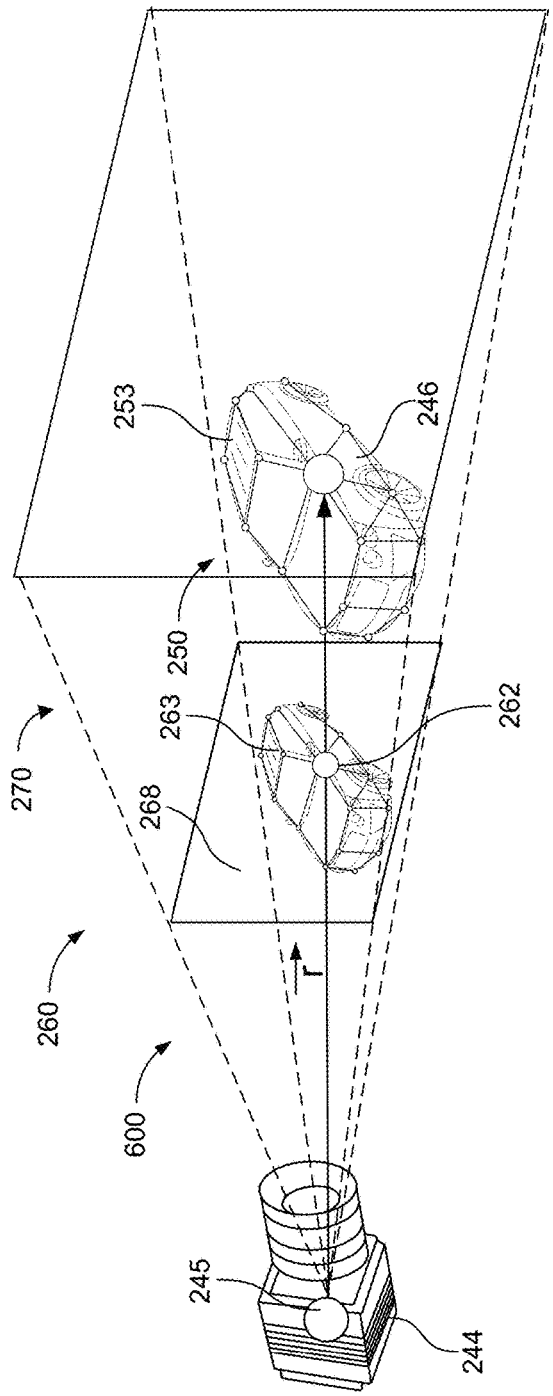

IMAGE MODIFICATION TECHNIQUES

FIELD

The present disclosure generally relates to image adjustment or modification. For example, aspects of the present disclosure are related to systems and techniques for modifying the scale and/or position of objects in images.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

When using a device to capture an image, a user may have to choose between different available fields of view provided by different image capture devices. In some cases, a user may choose whether to use a tele-angle or tele-photo lens that results in a larger object being depicted in an image with a narrow field of view or a wide-angle lens with a larger field of view. For example, an image captured using a wide-angle lens may capture a larger portion of a scene (due to the wide field of view), but objects in the image may be relatively small.

A user can provide an input (e.g., a zoom input, such as a pinch-to-zoom input) to increase the size of a portion of the image (e.g., to enlarge the two people in the bottom-left of the above image). However, the entire image will be zoomed into as well, causing much of the background to be outside of the field of view of the zoomed image.

BRIEF SUMMARY

In some examples, systems and techniques are described for adjusting one or more objects or features in an image. According to at least one example, a method is provided for processing one or more images. The method includes: obtaining a two-dimensional (2D) input image from a camera; obtaining a three-dimensional (3D) representation of the 2D input image; determining a first portion of the 3D representation of the 2D input image corresponding to a target object in the 2D input image; adjusting a pose of the first portion of the 3D representation of the 2D input image corresponding to the target object; generating a 2D output image having a modified version of the target object based on the adjusted pose of the first portion of the 3D representation of the 2D input image corresponding to the target object to be output on a display.

In another example, an apparatus for processing one or more images is provided that includes a memory (e.g., configured to store data, such as virtual content data, one or more images, etc.) and one or more processors (e.g., implemented in circuitry) coupled to the memory. The one or more processors are configured to and can: obtain a two-dimensional (2D) input image from a camera; obtain a three-dimensional (3D) representation of the 2D input image; determine a first portion of the 3D representation of the 2D input image corresponding to a target object in the 2D input image; adjust a pose of the first portion of the 3D representation of the 2D input image corresponding to the target object; generate a 2D output image having a modified version of the target object based on the adjusted pose of the first portion of the 3D representation of the 2D input image corresponding to the target object to be output on a display.

In another example, a non-transitory computer-readable medium is provided that has stored thereon instructions that, when executed by one or more processors, cause the one or more processors to: obtain a two-dimensional (2D) input image from a camera; obtain a three-dimensional (3D) representation of the 2D input image; determine a first portion of the 3D representation of the 2D input image corresponding to a target object in the 2D input image; adjust a pose of the first portion of the 3D representation of the 2D input image corresponding to the target object; generate a 2D output image having a modified version of the target object based on the adjusted pose of the first portion of the 3D representation of the 2D input image corresponding to the target object to be output on a display.

In another example, an apparatus for processing one or more images is provided. The apparatus includes: means for obtaining a two-dimensional (2D) input image from a camera; means for obtaining a three-dimensional (3D) representation of the 2D input image; means for determining a first portion of the 3D representation of the 2D input image corresponding to a target object in the 2D input image; means for adjusting a pose of the first portion of the 3D representation of the 2D input image corresponding to the target object; means for generating a 2D output image having a modified version of the target object based on the adjusted pose of the first portion of the 3D representation of the 2D input image corresponding to the target object to be output on a display.

In some aspects, at least a sub-portion of the modified version of the target object has an enlarged size in the 2D output image relative to a corresponding sub-portion of the target object in the 2D input image.

In some aspects, adjusting the pose of the first portion of the 3D representation of the 2D input image includes one or more of adjusting depth, vertical shifting, horizontal shifting, pitch rotation, yaw rotation, and roll rotation.

In some aspects, decreasing depth values of first one or more vertices of the first portion of the 3D representation of the 2D input image corresponding to the target object.

In some aspects, adjusting the pose of the first portion of the 3D representation of the 2D input image corresponding to the target object further comprises increasing depth values of second one or more vertices of the first portion of the 3D representation of the 2D input image.

In some aspects, the method, apparatuses, and computer-readable medium described above further comprise: obtaining a user input identifying the target object; the pose of the first portion of the 3D representation of the 2D input image corresponding to the target object is adjusted based on the user input.

In some aspects, the method, apparatuses, and computer-readable medium described above further comprise: obtaining an indication of amount of adjustment of the target object; adjusting the pose of the 3D representation of the 2D input image by an amount corresponding to the indication of the amount of adjustment of the target object.

In some aspects, the method, apparatuses, and computer-readable medium described above further comprise: determining an amount of adjustment of the target object, based on one or more of an adjustment range, an apparent size change, and a maximum amount of distortion; adjusting the pose of the 3D representation of the 2D input image by an amount corresponding to the amount of adjustment of the target object.

In some aspects, the method, apparatuses, and computer-readable medium described above further comprise: obtaining an object mask associated with the target object in the 2D input image; determining, based on the object mask, the first portion of the 3D representation of the 2D input image corresponding to the target object; determining, based on the object mask, a second portion of the 3D representation corresponding to one or more additional objects; combining the first portion of the 3D representation having the adjusted pose and the second portion of the 3D representation to generate a combined 3D mesh.

In some aspects, generating the 2D output image includes converting the combined 3D mesh to the 2D output image.

In some aspects, the method, apparatuses, and computer-readable medium described above further comprise: obtaining an object mask associated with one or more additional objects, different from the target object, in the 2D input image; determining, based on the object mask, the first portion of the 3D representation of the 2D input image corresponding to the target object; determining, based on the object mask, a second portion of the 3D representation corresponding to at least one of the one or more additional objects; adjusting the pose of the first portion of the 3D representation and fixing one or more vertices of the second portion of the 3D representation to generate an adjusted 3D mesh.

In some aspects, adjusting the pose of the first portion of the 3D representation of the 2D input image corresponding to the target object comprises decreasing depth values of vertices of the first portion of the 3D representation of the 2D input image corresponding to the target object such that the vertices have a pre-determined numerical correspondence relative to the fixed one or more vertices of the second portion of the 3D representation.

In some aspects, generating the 2D output image includes converting the adjusted 3D mesh to the 2D output image.

In some aspects, determining the first portion of the 3D representation of the 2D input image comprises at least one of feature detection and object detection.

In some aspects, determining the first portion of the 3D representation of the 2D input image is based on depth information corresponding to the first portion of the 3D representation of the 2D input image.

In some aspects, the method, apparatuses, and computer-readable medium described above further comprise: adjusting the pose of the first portion of the 3D representation of the 2D input image without adjusting a second portion of the 3D representation of the 2D input image not corresponding to the target object.

In some aspects, the pose of the first portion of the 3D representation of the 2D input image is adjusted by an amount determined based on a user input.

In some aspects, the pose of the first portion of the 3D representation of the 2D input image is adjusted with an amount determined based on a default configuration.

In some aspects, the pose of the first portion of the 3D representation of the 2D input image is adjusted based on a machine learning of user's preference and past behaviors.

In some aspects, the method, apparatuses, and computer-readable medium described above further comprise: determining a second portion of the 3D representation of the 2D input image corresponding to a second target object in the 2D input image; adjusting a pose of the second portion of the 3D representation of the 2D input image corresponding to the second target object; generating the 2D output image further based on the adjusted pose of the second portion of the 3D representation of the 2D input image corresponding to the second target object.

In some aspects, the adjustment to the pose of the second portion is different from the adjustment to the pose of the first portion.

In some aspects, a modification of at least a portion of the modified version of the target object includes one or more of vertical shifting, horizontal shifting, pitch rotation, yaw rotation, or roll rotation relative to a corresponding sub-portion of the target object in the 2D input image.

In some aspects, the method, apparatuses, and computer-readable medium described above further comprise: obtaining a second 2D input image from a camera, wherein the second 2D input image includes at least a portion of a scene included in the 2D input image; obtaining a second 3D representation of the second 2D input image, wherein at least a portion of the 2D output image is generated based on the second 3D representation of the second 2D input image.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 2A through FIG. 2C illustrate example image adjustment techniques, in accordance with some examples;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Figure 1A:
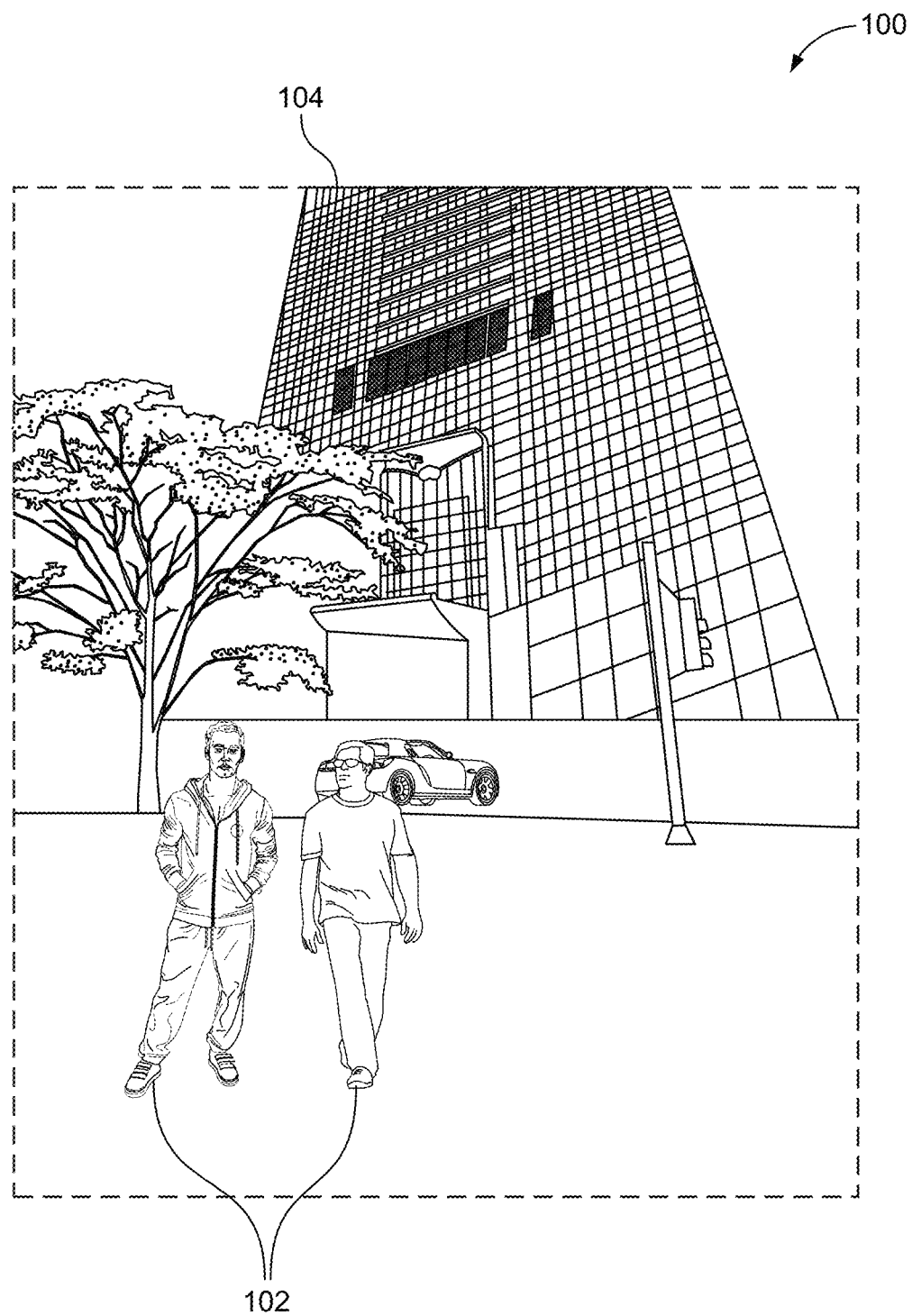
FIG. 1A through FIG. 1C are images depicting different fields of view in example images, in accordance with some examples of the present disclosure.
Figure 1B:
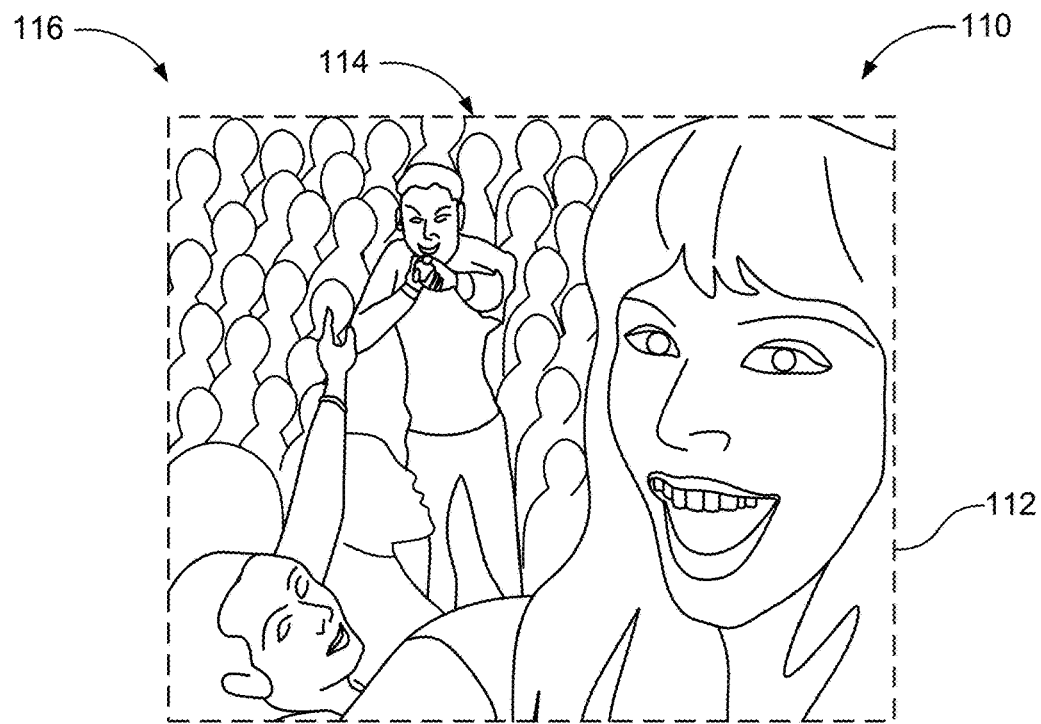
Figure 1C:
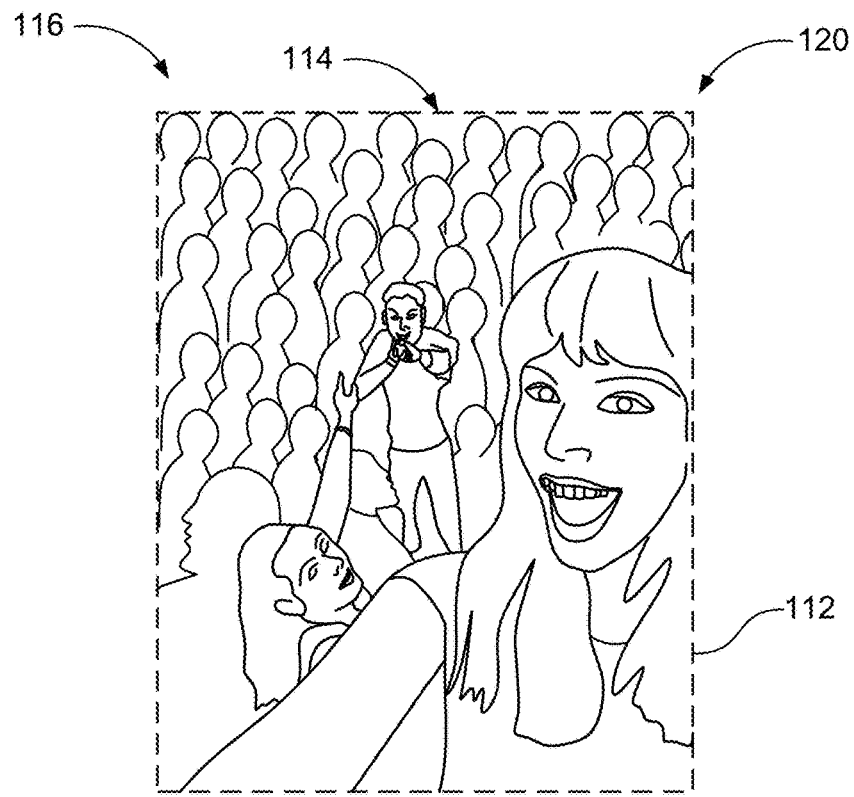

When capturing an image of a scene, photographers are often required to make a choice between capturing a wide field of view (FOV) that includes background objects and information that give context to a photograph and capturing a narrow field of view (e.g., with a telephoto lens) to capture foreground objects more prominently and/or with greater detail. FIG. 1A— FIG. 1C are images illustrating different scenes based on different selected FOV. FIG. 1A is a photograph of two people 102 posing in front of a large building 104 captured using a wide FOV. In FIG. 1A, the image 100 depicts the building 104 occupies nearly the full height of the image 100, while the people 102 occupy less than one quarter of the height of the image 100. FIG. 1B and FIG. 1C illustrate two images of an event captured with different FOV. In FIG. 1B, the image 110 is captured with a narrow FOV, and the person 112 near the camera (e.g., in the foreground) as well as the performer 114 are included prominently in the image 110 while only a limited portion of the background 116 is included in image 110. In FIG. 1C, the image 120 is captured with a wide FOV, and the person 112, due to being near to the camera continues to be prominently displayed. In the image 120, the performer 114 appears smaller relative to the person 112 and a larger portion of the background 116 provides further context that the event depicted in image 120 is taking place in a stadium.

Further, in some cases, a front-facing camera of a device may not have a zoom function to allow a user to zoom into a portion of an image (e.g., an object in the background of the image). For example, when capturing a "selfie" image using a front-facing camera of a mobile phone, there may be an inability for a user to provide an input to cause the mobile phone to zoom into an object in the background of the selfie image.

Image adjustment techniques can be used to adjust regions of interest (ROI) or target objects in captured images to combine the benefits of different FOV. For example, an image adjustment technique could be used to make the performer 114 appear more prominently (e.g., by zooming and/or increasing the size of the singer) in the image 120 while maintaining the scale of the background 116.

Figure 2A:
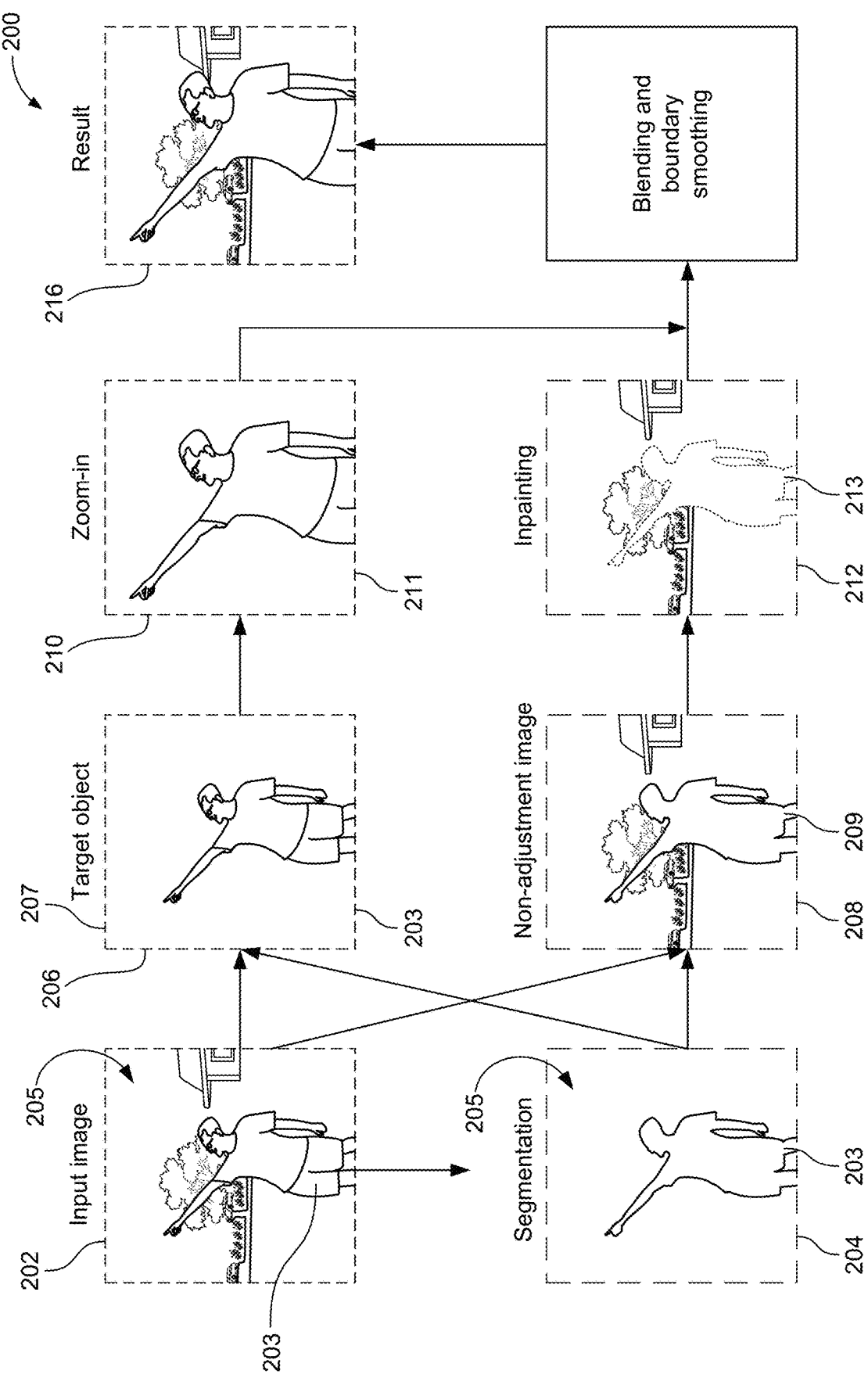

FIG. 2A through FIG. 2C illustrate example image adjustment techniques. FIG. 2A illustrates an example inpainting technique 200 that can be used to adjust ROI(s) or target objects in 2D images. Input image 202 illustrates the initial state of a 2D image captured by a camera. In the input image 202, a person 203 is in the foreground of the image, and many other objects (such as a tree, a building, or the like) are in the background 205 of the input image 202. In the example inpainting technique 200 shown in FIG. 2A, the target object selected for adjustment is the person 203, and the adjustment selected is to zoom in on (or enlarge) the person 203.

Segmentation image 204 provides an example of segmentation that can be performed on the input image 202 to separate the ROI or target object from the other objects in the input image 202. In segmentation image 204, the region of the input image 202 associated with the person 203 (represented by the white region shaped like person 203) is shown as being segmented from the remainder of the input image 202 (represented by the black background surrounding the person 203. In some cases, the segmentation illustrated in segmentation image 204 can be performed in whole or in part by a machine learning model. For example, a machine learning model can be trained to detect features in the input image 202. In some cases, based on the detected features in the input image 202, the machine learning model can classify objects in the input image 202. Further examples of segmentation are described in more detail below with respect to feature segmentation machine learning model 404 shown in FIG. 4. Example classifications for the person 203 can include "person," "foreground object" or the like. In some cases, a user can select which objects (or classifications) in the input image 202 to target for adjustment (e.g., zooming in) with the inpainting technique 200.

Based on the segmentation between the person 203 and the background 205 of the input image 202 shown in segmentation image 204, the inpainting technique 200 can generate a target object image 206 containing pixels of the input image 202 associated with the target object (e.g., person 203) and non-adjustment image 208 containing the pixels of the input image 202 associated with the background 205. In the target object image 206, the pixels associated with the background 205 have been removed as shown by the empty region 207, and conversely in the non-adjustment image 208, the pixels associated with the target object (e.g., person 203) have been removed as shown by the empty region 209. Adjusted image 210 illustrates zooming in on the person 203. As illustrated, the zooming in includes enlarging the size of the person 203 into an enlarged person 211. In some aspects, techniques for zooming in on the target object (e.g., person 203) can include an interpolation of the pixels associated with the target object over a larger portion when compared with the portion occupied by the target object in the input image 202. In some cases, after zooming in, the pixels of the enlarged person 211 may not fully overlap with the empty region 209 corresponding to the original size of the person 203. Similarly, the empty region 209 can occupy pixels that are not covered by the enlarged person 211 after zooming in. Inpainted image 212 illustrates an inpainting process, which attempts to fill the empty region 209 in non-adjustment image 208 with colors approximating (or estimating) the portion of the scene captured in the input image 202 that was obscured by the person 203. In one illustrative example, inpainting can be performed by interpolating and/or blending colors from pixels in the input image 202 neighboring the empty region 209 and applying the interpolated colors to the empty region 209. As shown in the inpainted image 212, an outline of the zoom object (e.g., person 203) in the inpainted portion 213 can remain after the inpainting is complete. The inpainting technique 200 can combine adjusted image 210 and inpainted image 212. In some cases, the inpainting technique 200 can perform blending and smoothing around the edges of the enlarged person 211 and the inpainted portion 213. In another illustrative example, a second input image (not shown) of the same scene or a portion of the same scene as input image 202 may include portions of the scene occluded by person 203 in the input image 202. In some examples, the inpainting technique 200 can combine pixels from the second input image can with the adjusted image 210, the inpainted image 212, one or more additional images, or any combination thereof. Image 216 illustrates the final result of the inpainting technique 200. The inpainting technique described with respect to FIG. 2A can be computationally intensive and can result in artifacts where the inpainting has to infer pixel color information for portions of the scene that were not visible in the input image.

FIG. 2B and FIG. 2C illustrate another example image adjustment technique 220 for adjusting the appearance of ROIs and/or target objects in an image. FIG. 2B illustrates an example of a 2D image 240 and a corresponding 3D mesh 250. The 2D image 240 includes a 2D representation of the target object 243 (e.g., a vehicle) and the 3D mesh 250 includes a 3D representation of the target object 253. As shown in FIG. 2B, the 2D image 240 can be considered a projection of the 3D mesh 250 onto the image plane 248. In some aspects, the 3D mesh 250 can also be considered an unprojection of the 2D image located at the image plane 248 into the 3D space of the 3D mesh 250. The location of the image plane 248 relative to the camera 244 can be determined based on the parameters of the camera such as focal length, field of view, skew (e.g., misalignment between the camera and the image plane 248), or the like. In the illustrated examples of FIG. 2B and FIG. 2C, the field of view 270 of the camera 244 is illustrated as a pyramid shaped region in the 3D space of the 3D mesh. An example pixel 242 in the 2D image 240 on the object is intersected by a ray r̄ originating from the center of projection 245 of the camera 244. A location corresponding to the center of projection 245 of the camera 244 in the physical world can be represented as a point in the 3D mesh 250. In some cases, if the distance of the target object 243 is at a known distance d from the center of projection 245, the point 246 (e.g., the 3D vertex) corresponding to the example pixel 242 can be located at a distance d from the camera center of projection 245 in the direction of ray r̄.

In some cases, the distance information corresponding to each of the pixels of the 2D image can be known when a distance information is included with the 2D image 240. In one illustrative example, the 2D image 240 can include an RGB-D image that includes color information and depth information for each pixel location in the 2D image 240. In some cases, the distance information corresponding to each of the pixels of the 2D image can be estimated from a 2D image that does not include explicit distance information.

In one illustrative example, the depth information can be inferred by a machine learning system trained to determine the depth (or relative depth of objects in a 2D image). In some cases, a training dataset can include 2D image with depth information for each pixel in the 2D image (e.g., RGB-D) images. In some cases, a training dataset can include images including with labeled features, objects and/or classifications (e.g., car, person, tree, building, foreground object, background object) as well as depth information corresponding to the labeled features, objects and/or classifications. During inference (e.g., after the machine learning model has been trained), the machine learning model can estimate the distances corresponding to the pixels, features, objects, labels, and/or classifications associated with the 2D image.

FIG. 2C illustrates an example technique for generating an adjusted 2D image 260 corresponding to the 2D image 240 in which the 2D representation of the target object 263 is increased in size and/or has the appearance of being zoomed-in compared to the 2D representation of the target object 243 shown in FIG. 2B. The zoomed-in effect can be achieved by moving the center of projection 245 of the camera 244 to a new position (e.g., with different vertex coordinates) in the 3D mesh 250. For example, the center of projection 245 of the camera can be moved closer to the 3D representation of the target object 253. As shown, the intersection between the ray r̄ that passes through the point 246 of the 3D representation of the target object 253 intersects the image plane 268 at pixel position 262. In some aspect, the adjusted 2D image 260 can be constructed by projecting rays from the camera center of projection 245 through each of the vertices of the 3D mesh 250 (including the vertices of the 3D representation of the target object 253) and determining the corresponding pixel position that intersects with the projected ray. However, such a technique can be computationally intensive.

Another example implementation for generating the adjusted 2D image 260 is to use a perspective projection technique. In one illustrative example, projection from the 3D mesh 250 into the adjusted 2D image 260 can include a perspective projection as shown in Equation (1)

$$\begin{bmatrix} x \\ y \end{bmatrix} = \frac{f}{z} \begin{bmatrix} X \\ Y \end{bmatrix} \quad (1)$$

Where x and y are the projected pixel coordinates in the 2D image, X is the X component (e.g., horizontal axis position) of the vertex in the 3D mesh, Y is the Y component (e.g., vertical axis position) of the vertex in the 3D mesh, and Z is the Z component (e.g., depth) of the vertex in the 3D mesh. In the example of Equation (1) the origin for the coordinate system of the 3D mesh can be located at the camera center of projection 245, also referred to as the camera coordinate system. In some cases, if the coordinates of the vertices of the 3D mesh 250 are relative to a coordinate system other than the camera coordinate system, the image adjustment technique 220 can perform a coordinate transformation to the camera coordinate system prior to the projection of the 3D mesh 250 onto the adjusted 2D image 260. Additionally or alternatively to perspective projection techniques, other projection techniques from 3D to 2D, including, without limitation, orthographic projection and oblique projection, can be used without departing from the scope of the present disclosure. In some implementations, a projection technique that corresponds to the projection technique of the physical camera that captured the 2D image can be used. In some cases, using a projection technique corresponding to the projection technique of the physical camera can reduce distortions in the adjusted 2D image that may be introduced by a mismatch between the physical camera projection technique and the projection technique utilized to project the 3D mesh 250 onto the adjusted 2D image 260.

The image adjustment technique 220 shown in FIG. 2B and FIG. 2C can have an advantage over the inpainting technique 200 shown in FIG. 2A because the 3D representation of the target object 253 and the remainder of the 3D mesh remain fixed. As a result, no empty regions such as empty region 209 shown in FIG. 2A are created, and the image adjustment technique 220 may not require inpainting. One disadvantage of the image adjustment technique 220 shown is that moving the location of the camera 244, thereby moving the center of projection 245, simultaneously adjusts (e.g., zooms-in) all of the vertices in the 3D mesh, including both the 3D representation of the target object 253, as well as vertices in the 3D mesh not associated with the target object (not shown), such as other objects (e.g., cars, people, buildings, trees, etc.). As a result, while the image adjustment technique 220 achieves the desired effect of adjusting (e.g., zooming in) on the target object, the image adjustment technique 220 does not provide the ability to adjust only ROI(s) or target object(s) while leaving other portions of the original 2D image 240 unadjusted.

Systems and techniques are needed for accurately and efficiently adjusting ROI(s) or target object(s) in an image without affecting other portions of the image. For example, adjusting the appearance of ROI(s) or target object(s) in images, while leaving other objects and/or portions of the images unadjusted can combine the advantages of both wide FOV and narrow FOV. For example, ROIs that appear small in an input image due to a wide FOV image capture can be adjusted in size (e.g., zoomed-in) to appear larger and/or closer to the camera in an adjusted image.

Systems, apparatuses, processes (also referred to as methods), and computer-readable media (collectively referred to as "systems and techniques") are described herein for selectively adjusting one or more regions of interest (ROIs) of an image without affecting other portions of the image. The systems and techniques allow a user to provide user input to adjust the appearance (e.g., increase a size and/or change position) of an ROI or target object (e.g., selected by a user, a machine learning model, or the like) in an image without affecting the appearance (e.g., size, position, or the like) of other portions of the image (e.g., a foreground object, background objects, etc.). In one illustrative example, the systems and techniques can enhance a user experience by allowing the user to provide input to selectively zoom in on one or more target objects or ROIs in an image while maintaining an FOV (e.g., a wide FOV provided by a wide-angle lens) so that objects other than the ROI(s)/target object(s) and background of the image are not zoomed or are zoomed by a lesser extent as compared to the target object.

In some examples, an image adjustment system can process one or more depth images and one or more color images (e.g., an image having red (R), green (G), and blue (B) color components per pixel, referred to as an RGB image). The depth image can indicate a depth of each pixel in the color image from the camera used to capture the color image. In some aspects, the one or more color images are captured using a wide-angle lens. In some cases, the image adjustment system can process one or more monochrome images instead of or in addition to the one or more color images. In some examples, a single image can include color information (e.g., RGB) and depth information per pixel, which is referred to as an RGB-depth (RGB-D) image.

The image adjustment system can generate a three-dimensional (3D) representation (e.g., a 3D mesh) of a two-dimensional (2D) color image using the color image and a depth image corresponding to the color image. For instance, based on the depth information for each pixel indicated by the depth image and a known FOV of the camera (e.g., based on camera parameters, such as intrinsic and/or extrinsic parameters), the system can determine a 3D position of a given pixel of the color image in 3D space (e.g., a 3D mesh). In one illustrative example a pixel distance (from the camera) of 10 meters as indicated by the depth image, the pixel can represent an intersection between a ray originating from the camera center of projection pointing in the direction of the 3D position corresponding to the pixel. The 3D position corresponding to the pixel in the 2D color image can be located 10 meters from the camera center in the direction of the ray. Once each pixel of the color image is unprojected, the system can connect the corresponding 3D positions (e.g., vertices) into a mesh. The system can texturize the mesh (with color) using the color information from the color image. Such a technique is referred to as perspective unprojection (from 2D RGB-D to 3D). In some cases, the 3D mesh can be a triangular or polygon mesh representing the structure of items in the image (e.g., objects such as people and other physical objects in the image). For example, the 3D mesh can include a collection of vertices, edges, and faces that define shapes of the objects in the 3D space of the scene.

The image adjustment system can also perform object detection (e.g., face detection) on the color image to detect one or more objects (e.g., faces) in the image. A user can provide a user input (e.g., via a touchscreen interface, using a voice input, using a gesture input, a gaze input, etc.) to indicate or select one or more ROIs (which can be associated with a target object or multiple target objects from the detected one or more objects) in the color image for which the user wants to adjust (e.g., make larger, change rotation, etc.).

In some cases, a most rectified object (e.g., most aligned with the vertical or horizontal axes of the 2D image) can be used to indicate or select one or more ROIs. In one illustrative example, a pose of the camera and/or the device incorporating the camera can be used to determine the most rectified object. In some cases, a scene or a portion of the scene captured in the 2D color image by a first camera can also be captured by a second camera. In some cases, objects in the scene or portion of a scene captured by both the first and second camera can be used to determine one or more ROIs. In some cases, the first camera and the second camera can be included in a single device (e.g., a mobile device with multiple cameras). In some cases, the first camera and the second camera can be included in separate devices.

In some examples, the image adjustment system can perform segmentation (e.g., binary segmentation, semantic segmentation, instance segmentation, etc.) on the color image to generate an object mask identifying one or more objects in the color image. In one example, such as when capturing a selfie image, the object mask can indicate pixels that belong to the object nearest to the camera in the image and pixels that do not belong to the object nearest to the camera in the image. The image adjustment system can use the object mask to prevent the one or more objects identified in the object mask from being adjusted (e.g., by preventing adjustment, or fixing the vertices associated with the masked object).

Based on the 3D mesh, the object mask, and the selection of an ROI (corresponding to a target object), the image adjustment system can determine an adjustment portion of the 3D mesh that corresponds to the ROI (or target object) and a non-adjustment portion of the 3D mesh (e.g., the portion of the 3D mesh that is prevented from being adjusted). The image adjustment system can morph the geometry (e.g., the vertices, edges, and faces) of the adjustment portion of the 3D mesh that corresponds to the ROI to effectively increase a size, change a rotation, or otherwise adjust a corresponding zoom of a two-dimensional (2D) output image to which the morphed 3D mesh will be reprojected. The morphing of the adjustment portion of the 3D mesh that corresponds to the ROI can leave the non-adjustment portion of the 3D mesh unchanged. In some cases, the morphing of the adjustment portion of the 3D mesh that corresponds to the ROI can also leave sub-portions of the adjustment portion that are unaffected by the morphing of the geometry of the ROI unchanged.

In one illustrative example, to morph the geometry of the adjustment portion of the 3D mesh to result in a zooming in on the ROI in the 2D image, the systems and techniques can decrease the depth values (e.g., z-values) of vertices (and thus the edges and faces) within the adjustment portion of the 3D mesh, thus bringing the vertices closer to the camera. In addition or alternatively, to morph the geometry of the adjustment portion of the 3D mesh, the system can translate the geometry of the adjustment portion along a translation vector that maintains a position of a sub-portion of the ROI in the 2D output image. For example, the translation vector can be selected to maintain a fixed 2D pixel position of a sub-portion of the ROI/target object (e.g., the center of a face). In some cases, the direction of the translation vector can correspond to the direction of the ray passing from the camera center through the fixed 2D pixel position and the corresponding 3D vertex. As used herein, morphing the geometry of the adjustment portion can also be referred to as adjusting a pose of the geometry of a first portion of the 3D mesh. In some implementations, after morphing the adjustment portion, the image adjustment system can fuse or combine the morphed (or pose adjusted) adjustment portion of the 3D mesh with the non-adjustment portion of the 3D mesh. In some implementations, the adjustment portion and non-adjustment portion can be maintained in a single 3D mesh with the 3D vertices corresponding to the non-adjustment portion being fixed and excluded from any morphing of the adjustment portion that may occur in close proximity to the non-adjustment portion.

The image adjustment system can then convert or translate the 3D mesh (including the morphed adjustment portion corresponding to the target object) to the 2D image domain, resulting in the output 2D image with a modified version of the ROI/target object. In one illustrative example, the ROI/target object in the 2D can be zoomed in (compared to the original image) after portions of the 3D mesh corresponding to the ROI/target object are morphed. For example, a perspective projection technique can be performed to convert the 3D mesh from the 3D domain to the 2D image domain. As a result, the output image includes the wide field-of view of the wide-angle lens and the enlarged version of the ROI/target object.

While examples are described herein for adjusting one or more ROI(s) in images obtained from a handheld camera, the image adjusting systems and techniques described herein can be used to perform image adjustment for images obtained by other devices, such as, a camera in a vehicle, a robotics device in a factory environment, and/or any other system including a camera.

Figure 3:
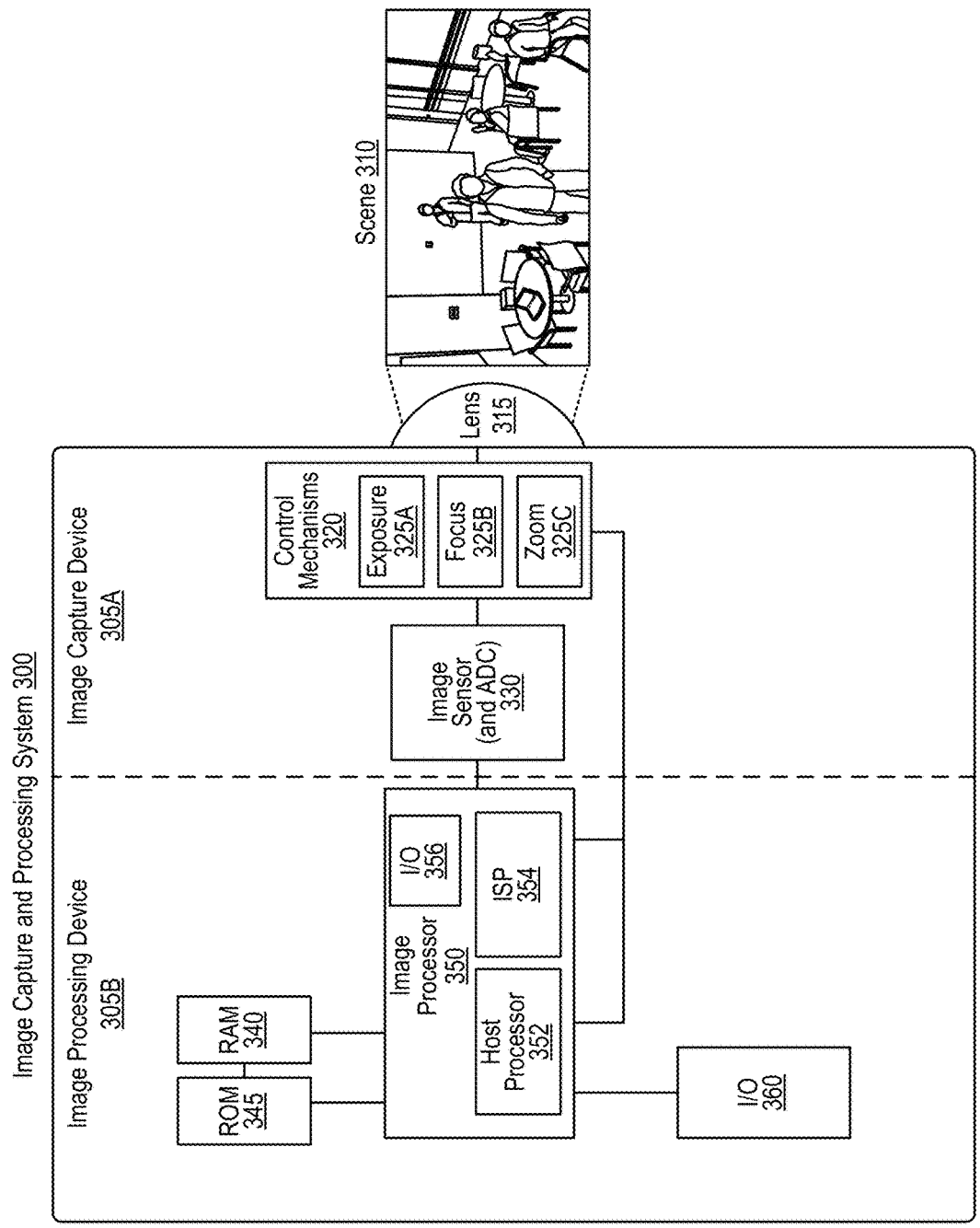
FIG. 3 is a block diagram illustrating an architecture of an image capture and processing device, in accordance with some examples of the present disclosure.

Various aspects of the techniques described herein will be discussed below with respect to the figures. FIG. 3 is a block diagram illustrating an architecture of an image capture and processing system 300. The image capture and processing system 300 includes various components that are used to capture and process images of scenes (e.g., an image of a scene 310). The image capture and processing system 300 can capture standalone images (or photographs) and/or can capture videos that include multiple images (or video frames) in a particular sequence. A lens 315 of the image capture and processing system 300 faces a scene 310 and receives light from the scene 310. The lens 315 bends the light toward the image sensor 330. The light received by the lens 315 passes through an aperture controlled by one or more control mechanisms 320 and is received by an image sensor 330.

The one or more control mechanisms 320 may control exposure, focus, and/or zoom based on information from the image sensor 330 and/or based on information from the image processor 350. The one or more control mechanisms 320 may include multiple mechanisms and components; for instance, the control mechanisms 320 may include one or more exposure control mechanisms 325A, one or more focus control mechanisms 325B, and/or one or more zoom control mechanisms 325C. The one or more control mechanisms 320 may also include additional control mechanisms besides those that are illustrated, such as control mechanisms controlling analog gain, flash, HDR, depth of field, and/or other image capture properties.

The focus control mechanism 325B of the control mechanisms 320 can obtain a focus setting. In some examples, focus control mechanism 325B store the focus setting in a memory register. Based on the focus setting, the focus control mechanism 325B can adjust the position of the lens 315 relative to the position of the image sensor 330. For example, based on the focus setting, the focus control mechanism 325B can move the lens 315 closer to the image sensor 330 or farther from the image sensor 330 by actuating a motor or servo (or other lens mechanism), thereby adjusting focus. In some cases, additional lenses may be included in the image capture and processing system 300, such as one or more microlenses over each photodiode of the image sensor 330, which each bend the light received from the lens 315 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 320, the image sensor 330, and/or the image processor 350. The focus setting may be referred to as an image capture setting and/or an image processing setting.

The exposure control mechanism 325A of the control mechanisms 320 can obtain an exposure setting. In some cases, the exposure control mechanism 325A stores the exposure setting in a memory register. Based on this exposure setting, the exposure control mechanism 325A can control a size of the aperture (e.g., aperture size or f/stop), a duration of time for which the aperture is open (e.g., exposure time or shutter speed), a sensitivity of the image sensor 330 (e.g., ISO speed or film speed), analog gain applied by the image sensor 330, or any combination thereof. The exposure setting may be referred to as an image capture setting and/or an image processing setting.

The zoom control mechanism 325C of the control mechanisms 320 can obtain a zoom setting. In some examples, the zoom control mechanism 325C stores the zoom setting in a memory register. Based on the zoom setting, the zoom control mechanism 325C can control a focal length of an assembly of lens elements (lens assembly) that includes the lens 315 and one or more additional lenses. For example, the zoom control mechanism 325C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 315 in some cases) that receives the light from the scene 310 first, with the light then passing through an afocal zoom system between the focusing lens (e.g., lens 315) and the image sensor 330 before the light reaches the image sensor 330. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 325C moves one or more of the lenses in the afocal zoom system, such as the negative lens and one or both of the positive lenses.

The image sensor 330 includes one or more arrays of photodiodes or other photosensitive elements. Each photodiode measures an amount of light that eventually corresponds to a particular pixel in the image produced by the image sensor 330. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 330) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 330 may alternately or additionally include opaque and/or reflective masks that block light from reaching certain photodiodes, or portions of certain photodiodes, at certain times and/or from certain angles, which may be used for phase detection autofocus (PDAF). The image sensor 330 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 320 may be included instead or additionally in the image sensor 330. The image sensor 330 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 350 may include one or more processors, such as one or more image signal processors (ISPs) (including ISP 354), one or more host processors (including host processor 352), and/or one or more of any other type of processor 1110 discussed with respect to the computing system 1100. The host processor 352 can be a digital signal processor (DSP) and/or other type of processor. In some implementations, the image processor 350 is a single integrated circuit or chip (e.g., referred to as a system-on-chip or SoC) that includes the host processor 352 and the ISP 354. In some cases, the chip can also include one or more input/output ports (e.g., input/output (I/O) ports 356), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 356 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 352 can communicate with the image sensor 330 using an I2C port, and the ISP 354 can communicate with the image sensor 330 using an MIPI port.

The image processor 350 may perform a number of tasks, such as de-mosaicing, color space conversion, image frame downsampling, pixel interpolation, automatic exposure (AE) control, automatic gain control (AGC), CDAF, PDAF, automatic white balance, merging of images to form an HDR image, image recognition, object recognition, feature recognition, receipt of inputs, managing outputs, managing memory, or some combination thereof. The image processor 350 may store image frames and/or processed images in random access memory (RAM) 140/3225, read-only memory (ROM) 145/1120, a cache, a memory unit, another storage device, or some combination thereof.

Various input/output (I/O) devices 360 may be connected to the image processor 350. The I/O devices 360 can include a display screen, a keyboard, a keypad, a touchscreen, a trackpad, a touch-sensitive surface, a printer, any other output devices 1135, any other input devices 1145, or some combination thereof. In some cases, a caption may be input into the image processing device 305B through a physical keyboard or keypad of the I/O devices 360, or through a virtual keyboard or keypad of a touchscreen of the I/O devices 360. The I/O 360 may include one or more ports, jacks, or other connectors that enable a wired connection between the image capture and processing system 300 and one or more peripheral devices, over which the image capture and processing system 300 may receive data from the one or more peripheral device and/or transmit data to the one or more peripheral devices. The I/O 360 may include one or more wireless transceivers that enable a wireless connection between the image capture and processing system 300 and one or more peripheral devices, over which the image capture and processing system 300 may receive data from the one or more peripheral device and/or transmit data to the one or more peripheral devices. The peripheral devices may include any of the previously-discussed types of I/O devices 360 and may themselves be considered I/O devices 360 once they are coupled to the ports, jacks, wireless transceivers, or other wired and/or wireless connectors.

In some cases, the image capture and processing system 300 may be a single device. In some cases, the image capture and processing system 300 may be two or more separate devices, including an image capture device 305A (e.g., a camera) and an image processing device 305B (e.g., a computing device coupled to the camera). In some implementations, the image capture device 305A and the image processing device 305B may be coupled together, for example via one or more wires, cables, or other electrical connectors, and/or wirelessly via one or more wireless transceivers. In some implementations, the image capture device 305A and the image processing device 305B may be disconnected from one another.

As shown in FIG. 3, a vertical dashed line divides the image capture and processing system 300 of FIG. 3 into two portions that represent the image capture device 305A and the image processing device 305B, respectively. The image capture device 305A includes the lens 315, control mechanisms 320, and the image sensor 330. The image processing device 305B includes the image processor 350 (including the ISP 354 and the host processor 352), the RAM 340, the ROM 345, and the I/O 360. In some cases, certain components illustrated in the image capture device 305A, such as the ISP 354 and/or the host processor 352, may be included in the image capture device 305A.

The image capture and processing system 300 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 300 can include one or more wireless transceivers for wireless communications, such as cellular network communications, 802.11 wi-fi communications, wireless local area network (WLAN) communications, or some combination thereof. In some implementations, the image capture device 305A and the image processing device 305B can be different devices. For instance, the image capture device 305A can include a camera device and the image processing device 305B can include a computing device, such as a mobile handset, a desktop computer, or other computing device.

While the image capture and processing system 300 is shown to include certain components, one of ordinary skill will appreciate that the image capture and processing system 300 can include more components than those shown in FIG. 3. The components of the image capture and processing system 300 can include software, hardware, or one or more combinations of software and hardware. For example, in some implementations, the components of the image capture and processing system 300 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 300. In some examples, the image adjustment system 400 can include the image capture and processing system 300, the image capture device 305A, the image processing device 305B, or a combination thereof.

Figure 4:
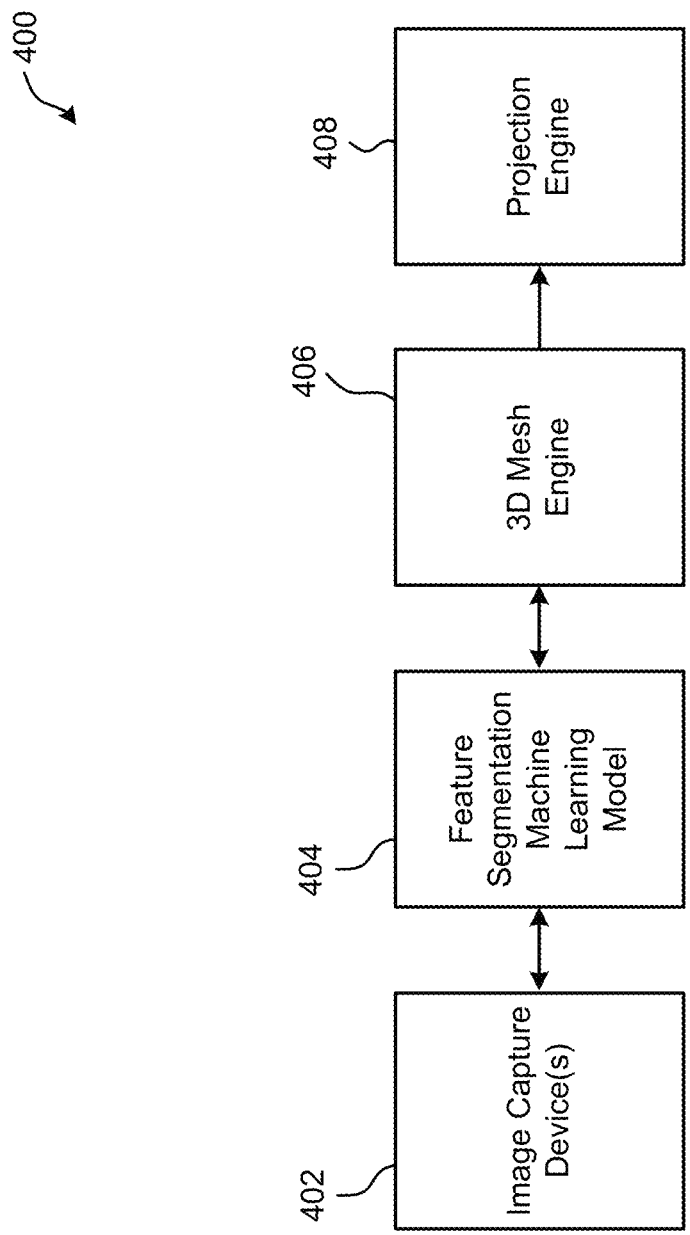
FIG. 4 is a block diagram illustrating an example image adjustment system, in accordance with some examples of the present disclosure.

FIG. 4 is a block diagram illustrating an example of an image adjustment system 400. The image adjustment system 400 includes various components that are used to process one or more images, such as changing the size and/or apparent position of a feature or object in the one or more images. The image adjustment system 400 can generate a 3D mesh based on an input image, adjust ROI(s) or objects in the 3D mesh to generate an adjusted 3D mesh, and project the adjusted 3D mesh back into a 2D image to generate an adjusted 2D image. As shown, the components of the image adjustment system 400 include one or more image capture devices 402, a feature segmentation machine learning model 404, a 3D mesh engine 406, and a projection engine 408.

In the description of FIG. 4 and image adjustment system 400 below, references to example images shown in FIG. 5A through FIG. 5K that illustrate different aspects of the image adjustment performed by image adjustment system 400. In the example illustrated in FIG. 5A through FIG. 5K, second person 504 is selected for adjustment (e.g., the second person 504 is the ROI or selected object). In the illustrated example, the adjustment applied to second person 504 is selected to bring the second person 504 closer to the first person 502. In one illustrative example, the vertices associated with the second person 504 can be adjusted by bringing the vertices closer to the camera location in the 3D coordinate system.

Returning to FIG. 4, The image adjustment system 400 can include or be part of a mobile or stationary telephone handset (e.g., smartphone, cellular telephone, or the like), a server computer (e.g., in communication with a vehicle computing system), a desktop computer, a laptop or notebook computer, a tablet computer, a set-top box, a television, a camera, a display device, a digital media player, a video streaming device, or any other suitable electronic device. In some examples, the image adjustment system 400 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the image adjustment system 400 (e.g., the one or more image capture devices 402, the feature segmentation machine learning model 404, the 3D mesh engine 406, and the projection engine 408 can be part of the same computing device. In some implementations, the components of the image adjustment system 400 can be part of two or more separate computing devices. In some cases, the image adjustment system 400 can be implemented as part of the computing system 1100 shown in FIG. 11.

While the image adjustment system 400 is shown to include certain components, one of ordinary skill will appreciate that the image adjustment system 400 can include more components or fewer components than those shown in FIG. 3. In some cases, additional components of the image adjustment system 400 can include software, hardware, or one or more combinations of software and hardware. For example, in some cases, the image adjustment system 400 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 3. In some implementations, additional components of the image adjustment system 400 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image adjustment system 400.

The one or more image capture devices 402 can capture one or more images. The one or more image capture devices 402 (e.g., cameras or other image sensors) can be included in a mobile device and can be directed toward a user of the device (e.g., with one or more front facing cameras) or directed away from the user of the device (e.g., with one or more rear facing cameras).

Each of the one or more image capture devices 402 can include a camera or other type of image sensor. In some examples, the one or more image capture devices 402 can include an infrared (IR) camera configured to capture IR images and/or near-infrared (NIR) images. For example, an IR camera or sensor can capture IR signals. IR signals have wavelengths and frequencies that fall in the IR electromagnetic spectrum. The IR electromagnetic spectrum includes wavelengths in the range of 2,500 nanometers (nm) to 1 millimeter (mm), corresponding to frequencies ranging from 430 terahertz (THz) to 400 gigahertz (GHz). The infrared spectrum includes the NIR spectrum, which includes wavelengths in the range of 780 nm to 2,500 nm. In some cases, the image adjustment system 400 can include an IR sensor configured to capture IR and NIR signals. In some cases, separate IR and NIR sensors can be included in the image adjustment system 400. In some examples, the one or more image capture devices 402 can include a camera configured to capture color images and/or monochrome images. The color images can include: red-green-blue (RGB) images; luma, chroma-blue, chroma-red (YCbCr or Y'CbCr) images; and/or any other suitable type of image. In one illustrative example, the image adjustment system 400 can include an RGB camera or multiple RGB cameras. In some cases, the one or more image capture devices 402 can include one or more IR cameras and one or more RGB cameras.

In some embodiments, the one or more image capture devices 402 can include one or more depth sensors. The one or more depth sensors can obtain measurements of distance corresponding to objects in a captured scene. In one illustrative example, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of objects. In some cases, the one or more depth sensors can produce depth images that include depth values corresponding to pixel locations in one or more images captured by the one or more image capture devices 402. In some cases, the depth sensor can be located in the same general location as other sensors of the one or more image capture devices 402. In some cases, the depth sensor can capture a depth image simultaneously with an image captured by one or more other sensors included in the one or more image capture devices 402. In some implementations, the systems and techniques described herein can also be used when depth information is inferred from the one or more images.

In one illustrative example, the one or more image capture devices 402, and in some cases the one or more depth sensors, can capture one or more RGB-D images. In some cases, the one or more image capture devices 402 can capture other images types that include depth information, such as monochrome-depth, NIR-depth, or the like. For the purposes of illustration, examples of the present disclosure discuss performing image adjustment on RGB-D images, but the systems and techniques described herein can also be used with other image types that include depth information without departing from the scope of the present disclosure.

Figure 5A:
FIG. 5A through FIG. 5K are images illustrating example stages of an image adjustment technique, in accordance with some examples of the present disclosure.
Figure 5B:
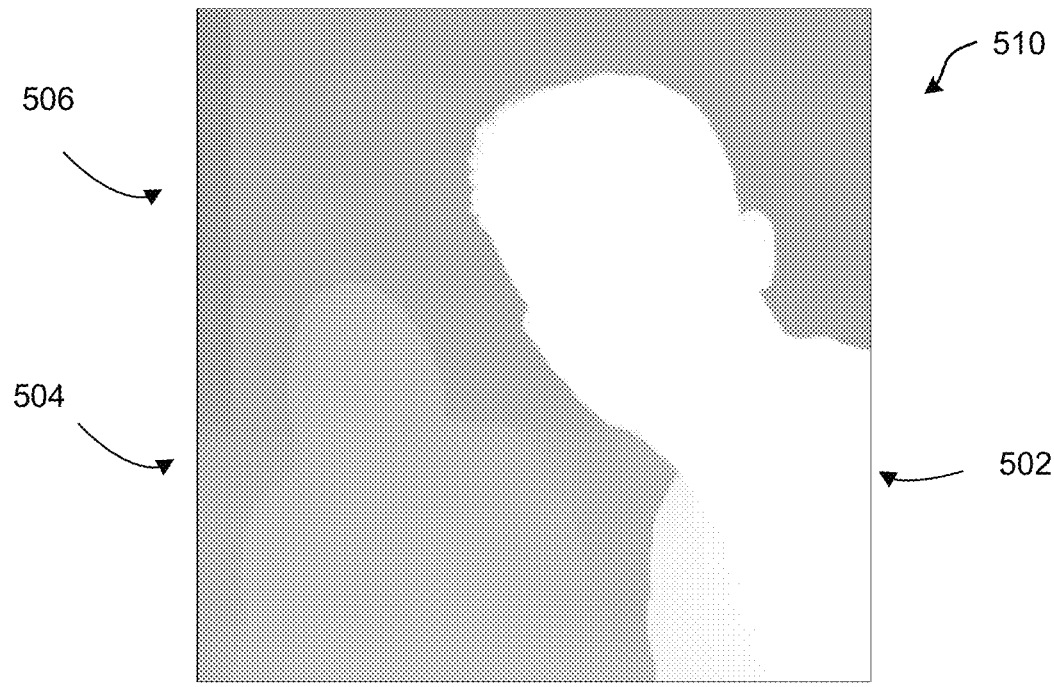

FIG. 5A illustrates an example 2D input image 500 (e.g., an RGB image) and FIG. 5B illustrates an example depth image 510. In some cases, the 2D input image 500 and the depth image 510 can collectively comprise an RGB-D image. Both the 2D input image 500 and depth image 510 include representations of a first person 502 positioned closer to the camera and a second person 504 positioned at a greater distance from the camera. In the depth image 510, the brightness of each pixel can represent the distance of an object or feature from the camera. In the example depth image 510, closer objects appear brighter (e.g., the first person 502), while more distant objects have lower brightness (e.g., the second person 504, or the background 506).

Returning to FIG. 4, the one or more images captured by the one or more image capture devices 402 can be provided as input to the feature segmentation machine learning model 404. The feature segmentation machine learning model 404 can be trained to detect spatial information (e.g., features) associated with the one or more images. In some cases, the feature segmentation machine learning model 404 can be further trained to provide one or more classifications to objects in the one or more images based on the detected features. The feature segmentation machine learning model 404 can in turn use the classifications to segment the image into different portions associated with the one or more classifications. For example, the feature segmentation machine learning model 404 can segment the one or more images into different portions associated with people, buildings, cars, furniture, plants, or the like.

The feature segmentation machine learning model 404 can also be trained to classify objects corresponding to the features extracted from the one or more images with one or more classifications. A training dataset that includes example images and classification labels can be used to train the feature segmentation machine learning model 404, such as using the techniques described with respect to FIG. 9 and FIG. 10 below. In one illustrative example, during inference (e.g., after the feature segmentation machine learning model 404 has been trained), the feature segmentation machine learning model 404 can use the feature vector to classify the one or more input images. Example classifications can include "person," "face," "building," "tree," and any other classification for which the feature segmentation machine learning model 404 is trained to classify.

Figure 5C:
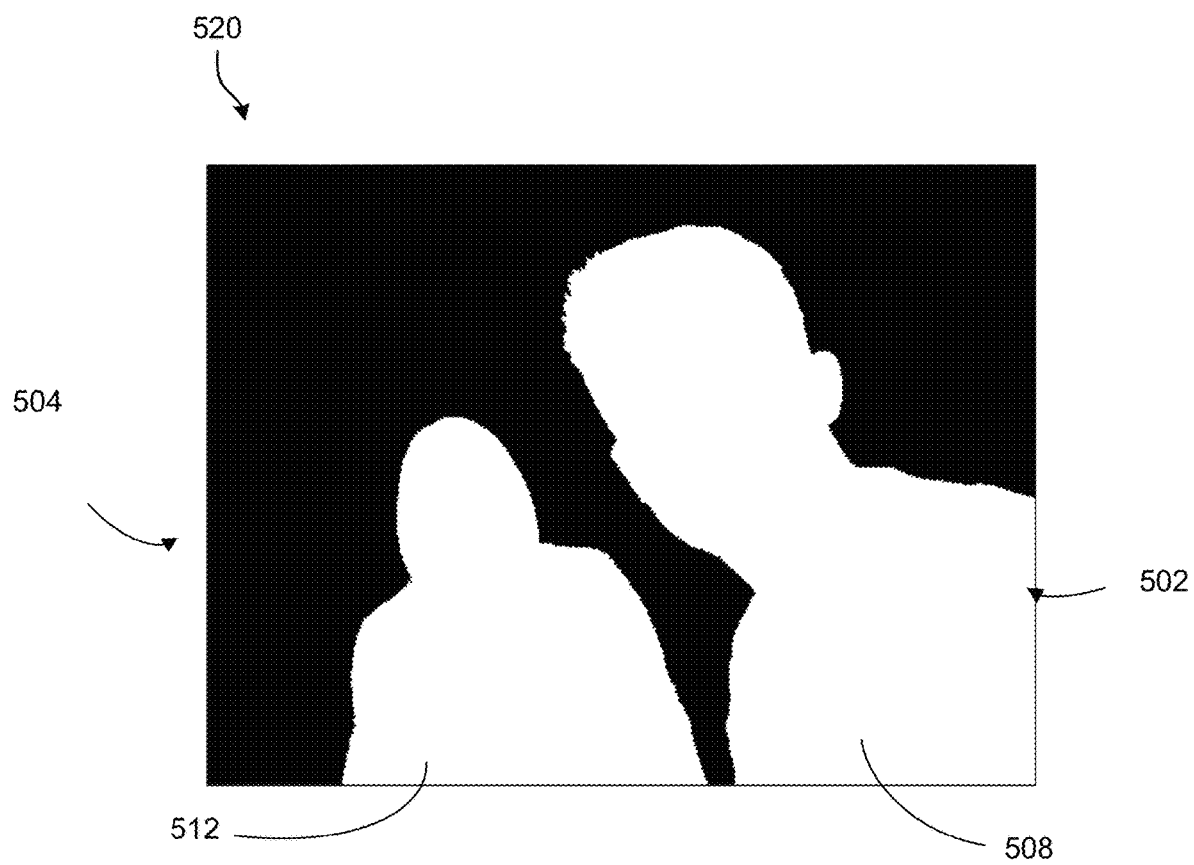

In one illustrative example, the feature segmentation machine learning model 404 can perform semantic segmentation of the image. In semantic segmentation, the feature segmentation machine learning model 404 can associate each object in a scene with one or more classifications (also referred to herein as labels). In some cases, if more than one object has the same label, semantic segmentation does not differentiate between the two objects. In such an example, the depth information in the one or more captured images (e.g., RGB-D images) can be used to differentiate between objects and further segment between the objects. For example, a portion containing two people in an input image can be classified with a single classifier of "person." FIG. 5C illustrates an example image 520 depicting a first classifier 508 (represented as white color) associated with the first person 502 and a second classifier 512 associated with the second person 504. In some examples, the first classifier 508 and/or second classifier 512 can represent a classification such as "person" or "face." In some aspects, with semantic segmentation, the feature segmentation machine learning model 404 may not be able to separately identify the first person 502 and second person 504 as different objects based on the first classifier 508 and the second classifier 512.

Figure 5D:
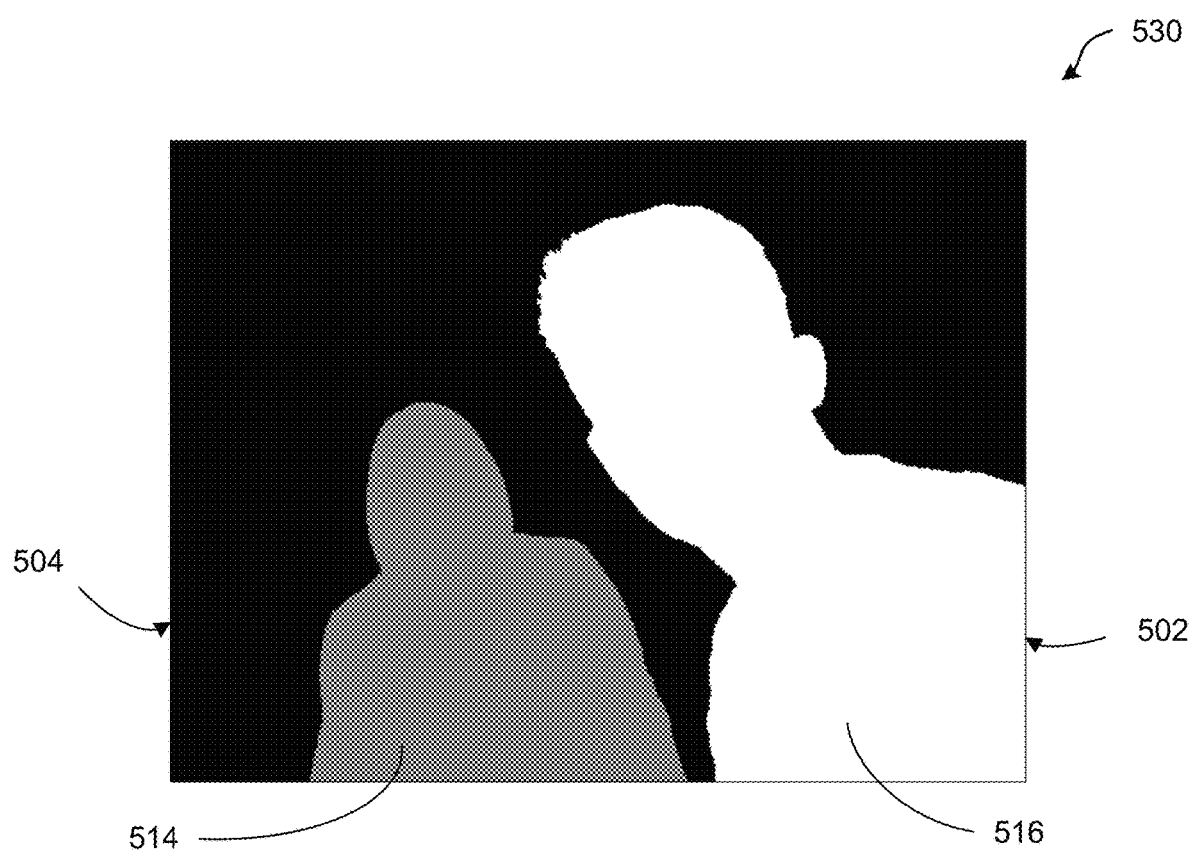

In another illustrative example, the feature segmentation machine learning model 404 can perform instance segmentation. In instance segmentation, the feature segmentation machine learning model 404 can separately identify multiple instances of objects with the same classifier differently. For example, image 530 shown in FIG. 5D provides an illustrative example of instance segmentation, where a first instance 514 associated with second person 504 is illustrated with a gray color and a second instance 516 associated with person 502 is illustrated as a white color. In some cases, with instance segmentation, the feature segmentation machine learning model 404 may be able to separately identify the first person 502 and second person 504 as different objects based on the first instance 514 and second instance 516.

Figure 5E:

In some cases, the 3D mesh engine 406 can utilize the depth information as well as parameters of the camera (e.g., focal length, field of view, etc.) to generate a 3D mesh corresponding to the RGB-D image. In some cases, for each pixel in the input image, the 3D mesh engine 406 can generate a corresponding 3D vertex in a 3D model of the scene depicted in the input image. In one illustrative example, the 3D mesh engine can generate the 3D mesh using the depth values and the field of view of the camera that captured the 2D input image (e.g., input image 500 of FIG. 5A). For example, 3D mesh engine 406 can utilize an unprojection technique to generate the 3D mesh. As discussed above with respect to FIG. 2B and FIG. 2C, an example technique for determining the position of a 3D vertex $V_{x,y}$ of the 3D mesh for a pixel at the coordinate x,y can include projecting a ray from the camera center that passes through the coordinate x,y and determining the corresponding 3D vertex $V^{x,y}$ based on the 3D coordinate that lies on the ray at a distance $d_{x,y}$ from the camera, where $d_{x,y}$ is the distance value in the depth image corresponding to the coordinate x,y. 3D mesh engine 406 can perform the unprojection technique for each pixel coordinate x,y in the 2D input image. Any suitable unprojection technique can be used without departing from the scope of the present disclosure. FIG. 5E illustrates an example image 540 of a 3D mesh 542 generated from the 2D input image. As shown, the 3D mesh 542 can include 3D representations of the first person 502 and the second person 504.

In some cases, the features, objects, and/or classifications determined by the feature segmentation machine learning model 404 can be provided as input to the 3D mesh engine 406. In some cases, based on the classifications, the 3D mesh engine 406 can associate vertices in the 3D mesh to the corresponding features, objects, and/or classifications associated with the corresponding pixel position in the 2D input image. In some cases, such as when the feature segmentation machine learning model 404 provides instance segmentation, the 3D mesh engine can differentiate between different features or objects associated with the same class based on the output from the feature segmentation machine learning model. In some cases, when the feature segmentation machine learning model 404 can provide only semantic segmentation, the 3D mesh engine 406 can distinguish between different objects or features in the 3D mesh based on the depth values associated with each object. For example, the 3D mesh engine 406 can determine two objects sharing the same classifier are distinct objects based on different portions of the 3D mesh associated with the classifier having different depth values. In one illustrative example, the feature segmentation machine learning model 404 may provide a classification of "face" that applies to both the first person 502 and the second person 504. In such an example, the 3D mesh engine 406 can determine a depth value at some position in the 3D mesh associated with the "face" classifier (e.g., the center of a bounding box, the tip of a nose, between the eyes, or the like) and determine that other vertices in the 3D mesh within a threshold distance from the determined depth are part of the same object.

Figure 5F:
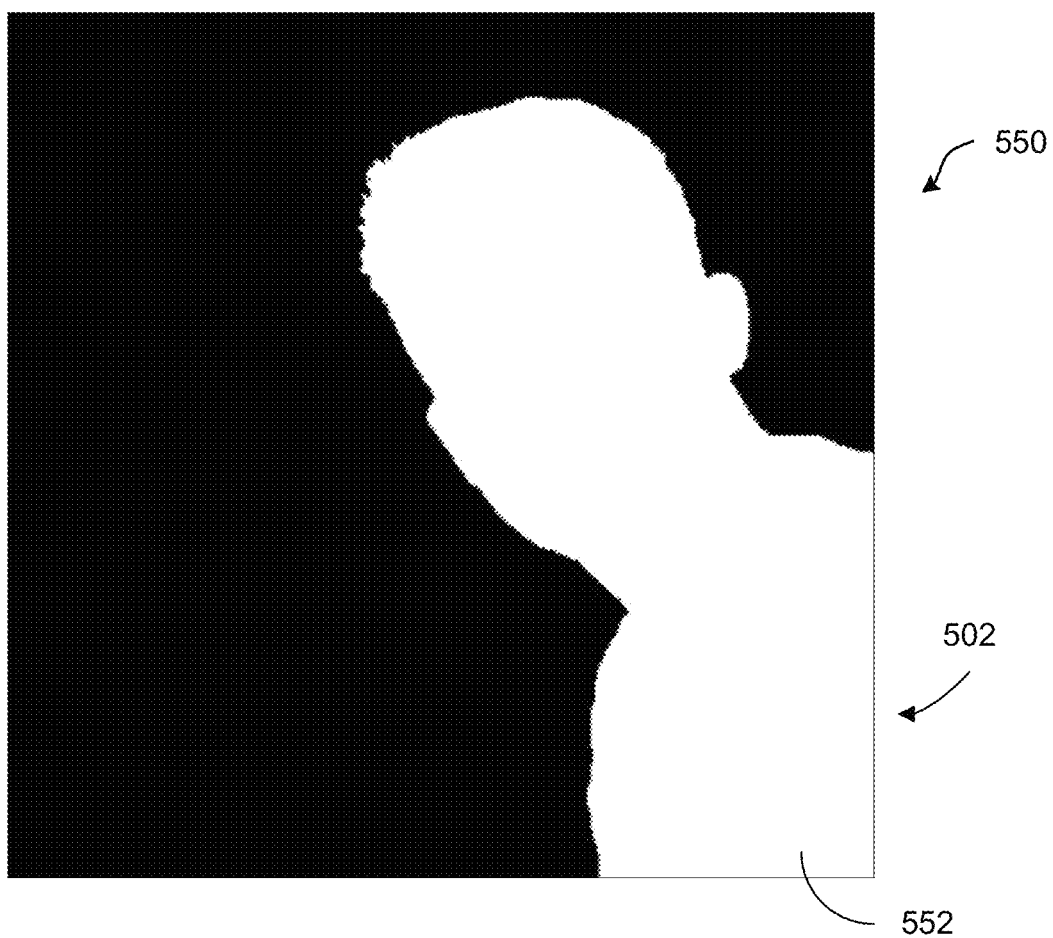

In some cases, the 3D mesh engine 406 and/or the feature segmentation machine learning model 404 can also apply one or more masks to regions (e.g., pixels) of the 2D input image and corresponding portions of the 3D mesh (e.g., vertices). FIG. 5F illustrates in image 550 including one example mask, where pixels associated with the person 502 are shown as a masking region 552. In some examples, a foreground object nearest to the camera can be selected for inclusion in the masking region 552 by the 3D mesh engine 406 and/or the feature segmentation machine learning model 404. In the illustrated example, the first person 502 in the foreground of the 2D input image 500 is selected for masking because any erroneous adjustment of vertices associated with the first person 502 can create noticeable visual artifacts in an adjusted 2D image after image adjustment is complete. In some cases, other masks and/or multiple masks can be used without departing from the scope of the present disclosure.

In some cases, the 3D mesh engine 406 can determine a non-adjustment portion of the 3D mesh (e.g., 3D mesh 542) based on the masking region 552 in the 2D image. In some cases, any portion of the 3D mesh outside of the non-adjustment portion can be referred to as an adjustment region. Inclusion of vertices in the adjustment portion does not necessarily mean included vertices will be adjusted by the 3D mesh engine 406. In some implementations, based on determination of an adjustment portion and a non-adjustment portion in the 3D mesh, the 3D mesh engine 406 can separate the 3D mesh into an adjustment 3D mesh and a separate non-adjustment 3D mesh.

Figure 5G:
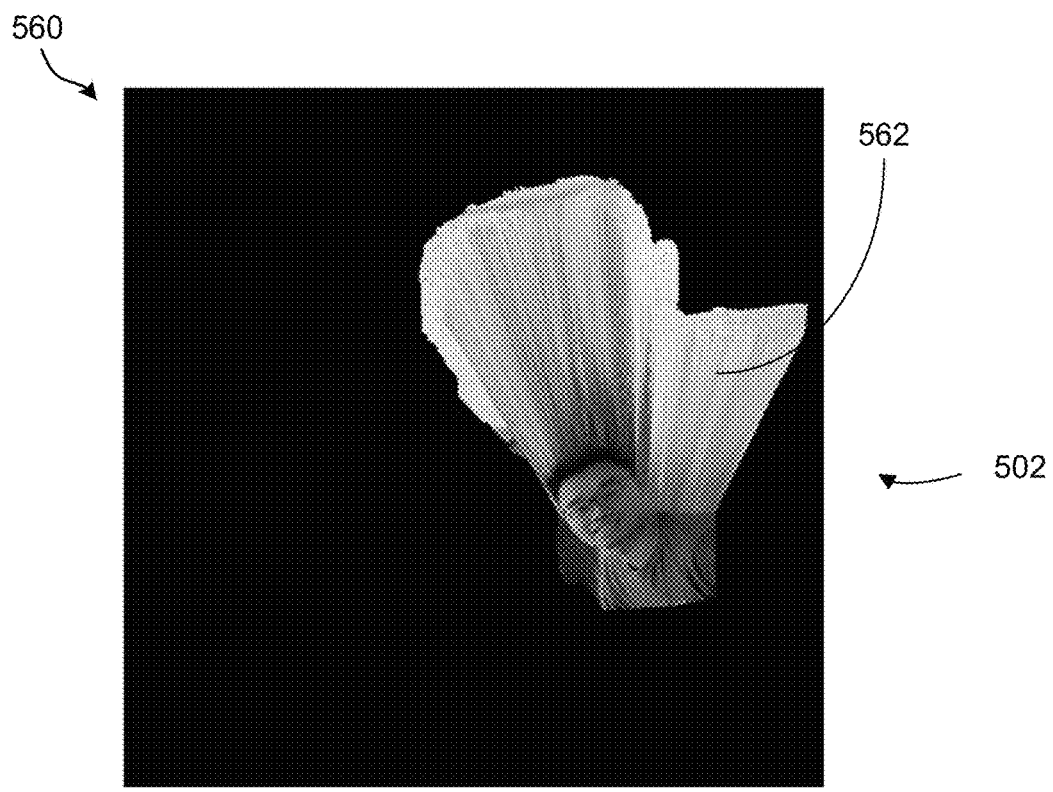
Figure 5H:
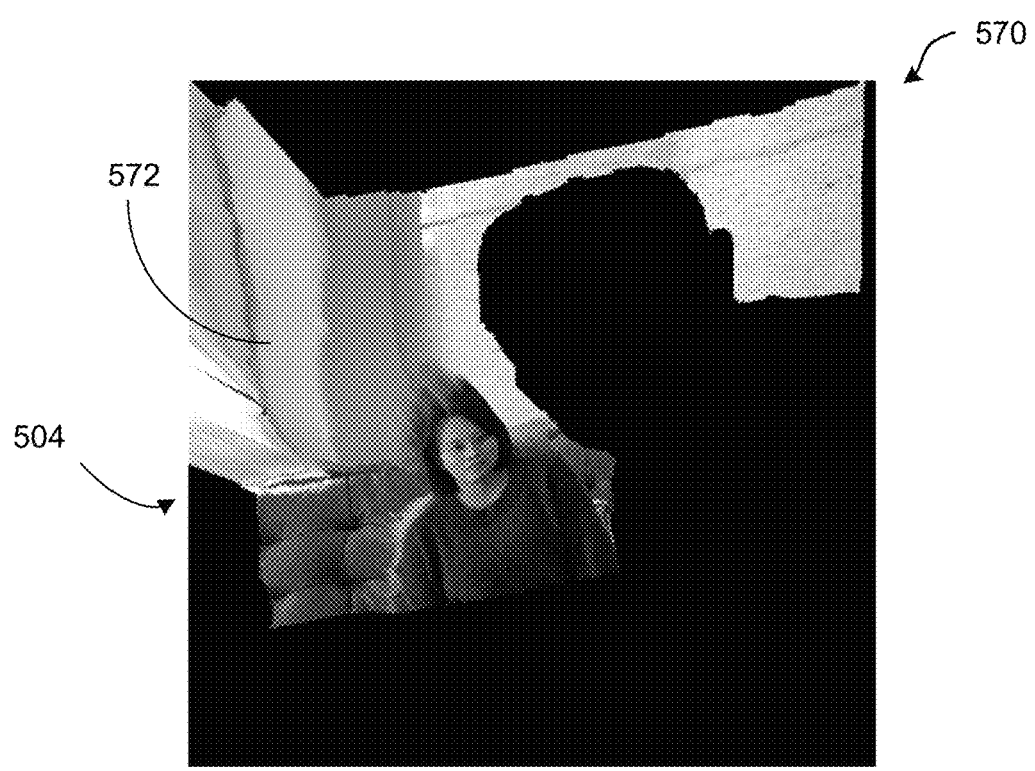

FIG. 5G illustrates an image 560 illustrating an example non-adjustment 3D mesh 562 that includes the 3D representation of the person 502 and can be generated based on the masking region 552 shown in FIG. 5F. FIG. 5H illustrates an example image 570 illustrating an adjustment 3D mesh 572 that includes the second person 504 as well as other objects not included in the masking region 552 such as a sofa, walls, etc.

Returning to FIG. 4, in some implementations, the 3D mesh engine 406 may not separate the 3D mesh into a separate non-adjustment portion of the 3D mesh and adjustment portion of the 3D mesh, but may instead fix the coordinates of or otherwise prevent adjustment to the vertices of the 3D mesh within the non-adjustment portion.

Once the 3D mesh engine 406 has generated the 3D mesh (or multiple 3D meshes) based on the 2D input image, determined one or more masks, and/or performed further segmentation of objects in the 3D mesh based on depth values, the 3D mesh engine 406 can adjust one or more portions of the 3D mesh. In some cases, the 3D mesh engine 406 can adjust one or more portions of the 3D mesh associated with one or more of the features detected and/or classified by the feature segmentation machine learning model 404 as associated with 3D vertices in the 3D mesh. For example, the 3D mesh engine 406 may obtain an indication of one or more selected objects (or ROI(s)) in the input image to be adjusted. In some cases, the indication of one or more selected objects in the input image (e.g., 2D input image 500 of FIG. 5A) to be adjusted may be based on a user input. In one illustrative example, a user may be able to indicate the one or more selected objects using a physical contact (e.g., tapping a screen, swiping, etc.), a gesture (e.g., detected by a camera or other sensor), using an input device, or through any other means allowing a user to interact with the image adjustment system 400.

Figure 5I:
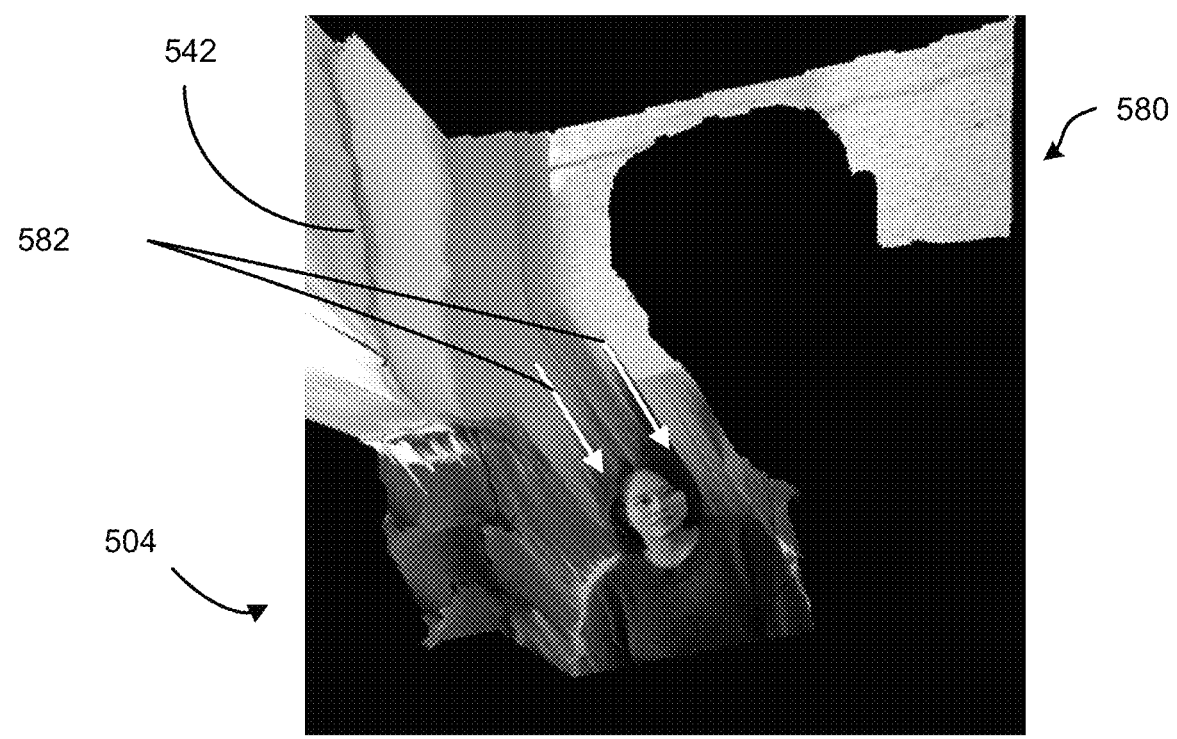
Figure 5J:

Based on the indication of the one or more selected objects in the input image to be adjusted, the 3D mesh engine 406 can adjust the 3D mesh (e.g., mesh 542 shown in FIG. 5E). In some cases, the 3D mesh engine 406 can adjust the vertices in the 3D mesh associated with the one or more ROI(s) or objects. Adjustments to the ROI(s) or objects are also referred to as changing the of the ROI(s) or objects. The changes to pose of the ROI(s) or objects can include changes in depth, vertical shifting, horizontal shifting, pitch rotation, yaw rotation, roll rotation, and any combination thereof. In one illustrative example, the mesh adjustment can include bringing the one or more selected objects closer to the camera in the 3D model. FIG. 5I illustrates an image 580 showing the vertices in the 3D mesh associated with the second person 504 shifted in the direction of the arrows 582. In the illustrated example, the direction of arrows 582 was selected to maintain a fixed position of a sub-portion near the center of the face (e.g., the nose, between the eyes, etc.). of the second person 504 in the adjusted 2D image.

In one illustrative example, a specific anchor point of the object can be selected to remain in a fixed position in the adjusted 2D image. In such an example, the pose change can include adjusting the vertices of the one or more selected objects along the direction of a ray that passes through the center of the camera and the initial position of the 3D vertex corresponding to the anchor point. Another illustrative example of adjusting the pose can include reducing the depth values of a portion of or all of the vertices associated with the selected object. In some cases, reducing the depth values of vertices of the selected object can result in enlarging the size of the selected object in the resulting 2D image. A further illustrative example of adjusting the pose can include (simultaneously) increasing and reducing the depth values of a portion of or all of the vertices associated with the selected object. In some cases, increasing and reducing the depth values of vertices of the selected object can result in a pitch rotation, a yaw rotation and/or a roll rotation of the selected object in the resulting 2D image.

In some cases, the image adjustment system 400 may obtain multiple images of the scene or a portion of the scene captured in the 2D input image. For example, an electronic device may include a first image capture device and a second image capture device (e.g., included in image capture devices 402) that simultaneously capture at least a partial common portion of the scene. In some cases, a single image sensor may capture multiple images of the scene to provide, for example, a zero shutter lag capture, preview images, or the like. In some examples, the image adjustment system can generate multiple 3D meshes based on the multiple images of the scene or portion of the scene. In some cases, the 3D mesh engine 406 can incorporate (e.g., merge, composite, inpaint, or the like) portions from the multiple 3D meshes to generate a combined 3D mesh. In one illustrative example the 3D mesh engine 406 can adjust 3D vertices from a first 3D mesh associated with a selected object in a first 2D image and also include 3D vertices from a second 3D mesh associated with a second 2D image. In one illustrative example, the 3D vertices associated with the selected object may be shifted horizontally, and the portion of the 3D mesh previously occupied by the selected object may incorporate portions from the second 2D mesh.

Figure 5K:

After the 3D mesh is adjusted by the 3D mesh engine 406, the projection engine 408 can project the 3D mesh onto an adjusted 2D image. The projection engine 408 can utilize any of the projection techniques described above with respect to FIG. 2B and FIG. 2C. In one illustrative example, the projection engine 408 can utilize the perspective projection of Equation (1). In some aspects, the projection engine 408 can use any other projection technique, including, without limitation, orthographic projection or oblique projection to generate the adjusted 2D image without departing from the scope of the present disclosure. FIG. 5K illustrates an adjusted 2D image 595 that can be produced by the image adjustment system 400 In some implementations, the projection engine 408 can utilize a projection technique that corresponds to the projection technique of the physical camera that captured the 2D image. In some cases, using a projection technique corresponding to the projection technique of the physical camera can reduce distortions in the adjusted 2D image that may be introduced by a mismatch between the physical camera projection technique and the projection technique utilized by the projection engine 408.

Figure 6:
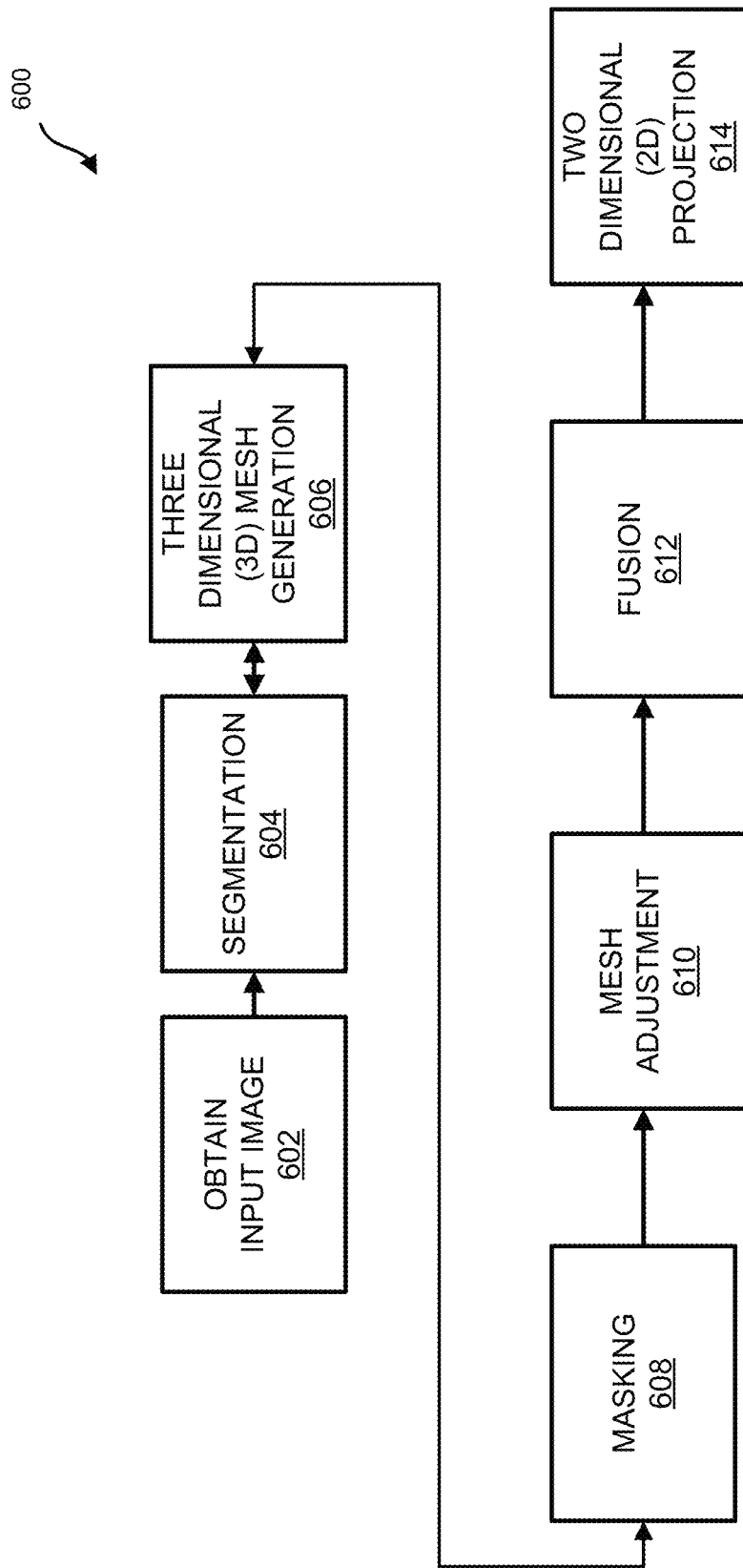
FIG. 6 is a flow diagram illustrating an example image adjustment process, in accordance with some examples of the present disclosure.

FIG. 6 illustrates an example process 600 for performing image adjustment according to examples of the present disclosure. At block 602, the process 600 can obtain a 2D input image (e.g., from image capture devices 402 shown in FIG. 4). At block 604, the process 600 can perform segmentation of the features or objects included in the input image. For example, the process 600 can perform one or more of feature detection, semantic segmentation, instance segmentation, object classification, or the like, as described with respect to feature segmentation machine learning model 404 of FIG. 4.

At block 606, the process 600 can include generating a 3D mesh based on the depth information and/or color information included in the RGB-D image obtained at block 602. In some cases, for each pixel in the 2D image, a corresponding 3D vertex in a 3D model of the scene can be generated using the unprojection techniques described above with respect to FIG. 2B, FIG. 2C, and the 3D mesh engine 406 of FIG. 4, or using any other suitable technique for converting a 2D image into a 3D mesh.

At block 608, the process 600 can perform masking of the 3D mesh. In some cases, the masking can include creating a non-adjustment portion and an adjustment portion in the 3D mesh. In some cases, the non-adjustment portion and the adjustment portion can be separated into two separate 3D meshes to prevent adjustment of the non-adjustment portion. In some cases, a single mesh can include both the non-adjustment portion and the adjustment portion and the vertices of the non-adjustment portion can be fixed or otherwise prevented from being adjusted. In some aspects, the masking can include vertices in the 3D mesh associated with the one or more ROI(s) or object(s).

At block 610, the process 600 can perform a mesh adjustment on the 3D mesh generated at block 608. In some cases, the process 600 can obtain an input indicating one or more selected objects (or ROIs) in the 2D image have been selected for adjustment. For example, the process 600 can adjust the pose of the one or more selected objects by changing the coordinates of the vertices corresponding to the one or more selected objects. As noted above with respect to 3D mesh engine 406 of FIG. 4, each 2D pixel location in the input image obtained at block 602 can have a corresponding 3D vertex in the 3D mesh generated at block 608. In some cases, process 600 can associate the 3D vertices generated at block 608 with one or more objects (or features). For example, features, objects, and/or classes determined at block 604 and associated with each of the 2D pixel locations of the input image can also be associated with the corresponding 3D vertices. Once the 3D vertices corresponding to the selected objects are identified, the process 600 can adjust the vertices to provide the desired effect (e.g., enlarging, translation, rotation, etc.) in the adjusted 2D image.

At block 612, the process 600 can perform a fusion between two or more portions of the 3D mesh. For example, if the process 600 separated the 3D mesh into a non-adjustment 3D mesh and an adjustment 3D mesh at block 608, the process 600 can combine the non-adjustment 3D mesh and adjustment 3D mesh into a single combined 3D mesh (e.g., as shown in image 590 of FIG. 5J). In some cases, where the process 600 did not generate separate 3D meshes but instead locked vertices in a non-adjustment portion of the 3D mesh, the process 600 may not be required to perform any fusion of the 3D mesh.

At block 614, the process 600 can generate an adjusted 2D image using projection techniques described herein with respect to FIG. 2B, FIG. 2C, and projection engine 408 of FIG. 4. One illustrative example of a projection that can be performed by process 600 is the perspective projection shown in Equation (1). However, any projection or rendering technique that can convert a 3D mesh into a 2D image can be used by the process 600 without departing from the scope of the present disclosure. However, any projection or rendering technique that can convert a 3D mesh into a 2D image can be used by the process 600 without departing from the scope of the present disclosure. In some implementations, the process 600 can use a projection technique that corresponds to the physical projection of the camera that captured the 2D image. In some cases, using a projection technique corresponding to the projection in the physical camera can reduce distortions in the adjusted 2D image that may be introduced by a mismatch between the physical camera projection and the projection technique utilized by the process 600 at block 614.

Process 600 illustrated in FIG. 6 provides one illustrative example of an image adjustment process according to the present disclosure. However, the order of operations of process 600 can be changed without departing from the scope of the present disclosure. In addition, one or more steps of process 600 can be omitted or additional steps can be performed without departing from the scope of the present disclosure.

In some cases, the process 600 can also obtain an input corresponding to an amount of adjustment to be applied to the one or more objects or features. In some cases, the process 600 can dynamically determine the amount of adjustment to be applied to the one or more selected objects.

In one illustrative example, the process 600 can determine an approximate size of a foreground object (e.g., using a bounding box, computing a number of image pixels occupied by the foreground object, or the like) and the approximate size for each of the one or more objects. In such an example, the process 600 can determine the amount of adjustment based on the relative sizes of the foreground object and the one or more objects. In one illustrative example, the one or more objects can be adjusted to enlarge the size of the one or more objects in the 2D image such that it has a size corresponding to a certain numerical correspondence (e.g., a certain percentage value, ratio, proportion, function, relation, or the like) with the size of the foreground object. In one illustrative example, the one or more selected objects (or ROIs) can be adjusted to have a size corresponding to a pre-determined ratio in the range between 7/10 (e.g., seventy percent) and 9/10 (e.g., ninety percent) of the size of the foreground object. In some cases, the numerical correspondence (e.g., percentage value) and/or a range for the numerical correspondence (e.g., percentage value range) can be limited based on the distance in the 3D mesh between the foreground object and the background object. In another illustrative example, if a distance (e.g., an average distance) between the foreground object and a first one of the one or more selected objects is small (e.g., less than one half meter (m), less than 1 m, less than 3 m, or the like), then the first object of the one or more selected objects can be adjusted up to a ratio of 1 (e.g., one hundred percent) of the size of the foreground object. In another illustrative example, if a distance (e.g., an average distance) between the second object of the one or more selected objects and the foreground objects is large (e.g., greater than 5 m, greater than 10 m, or any other selected distance), then the second object of the one or more selected objects can be adjusted up to a ratio of 4/5 (e.g., eighty percent) of the size of the foreground object. Other techniques for determining the amount of adjustment for each of the one or more selected objects can also be used without departing from the scope of the present disclosure. For example, the total change in pose of an object can be limited within an adjustment range. In some cases, the adjustment range for changing the pose of the object can be determined based on a maximum amount of distortion in the 2D image that would result from performing the pose change. In another example, a maximum amount of adjustment for each of the one or more selected objects can be based on a ratio of the apparent size of the object in the adjusted image compared to the original image. For example, the maximum amount of adjustment may be limited to allow the apparent size of each object to increase by fifty percent, one hundred percent, two hundred percent, or any other value.

As noted above, the image adjustment system 400 and related techniques described herein can allow a system to adjust ROI(s) or object(s) in an image without adjusting other objects in the image or scene. For instance, the image adjustment system 400 can adjust the appearance of an image with two people sitting apart from each (e.g., as shown in FIG. 5A and FIG. 5B) other to bring the two people closer together. In some cases, the adjustment can include decreasing the depth of a target object, shifting vertically, pitch rotation, roll rotation, yaw rotation, or the like. By performing the adjustment on the 3D mesh, the image adjustment system can maintain continuity (e.g., continuity of the 3D mesh between the adjusted target object(s) and the remaining portions of the image that are not adjusted.

Figure 7A:
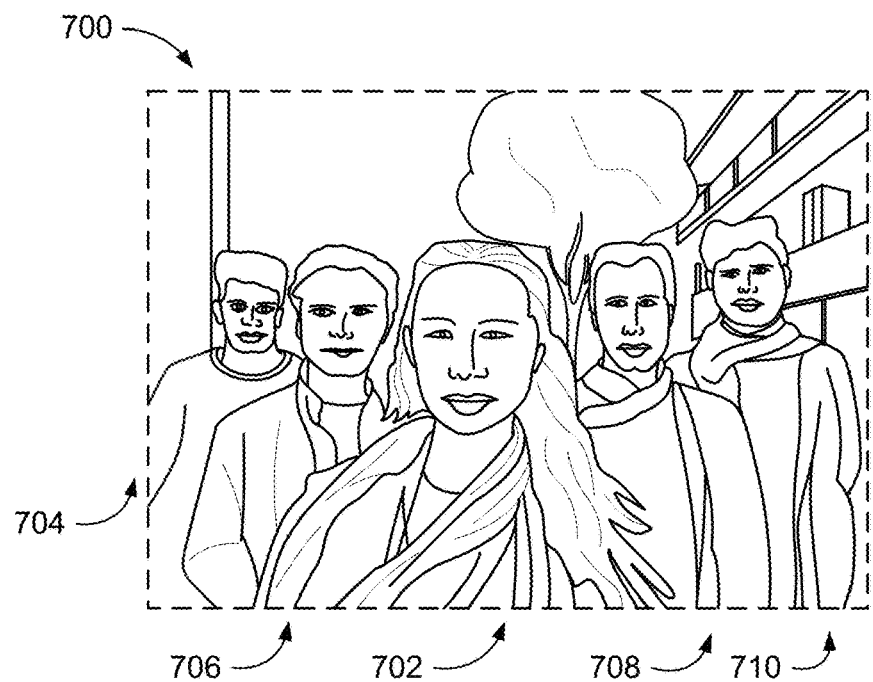
FIG. 7A through FIG. 7E are images illustrating example image adjustments, in accordance with some examples of the present disclosure.
Figure 7B:
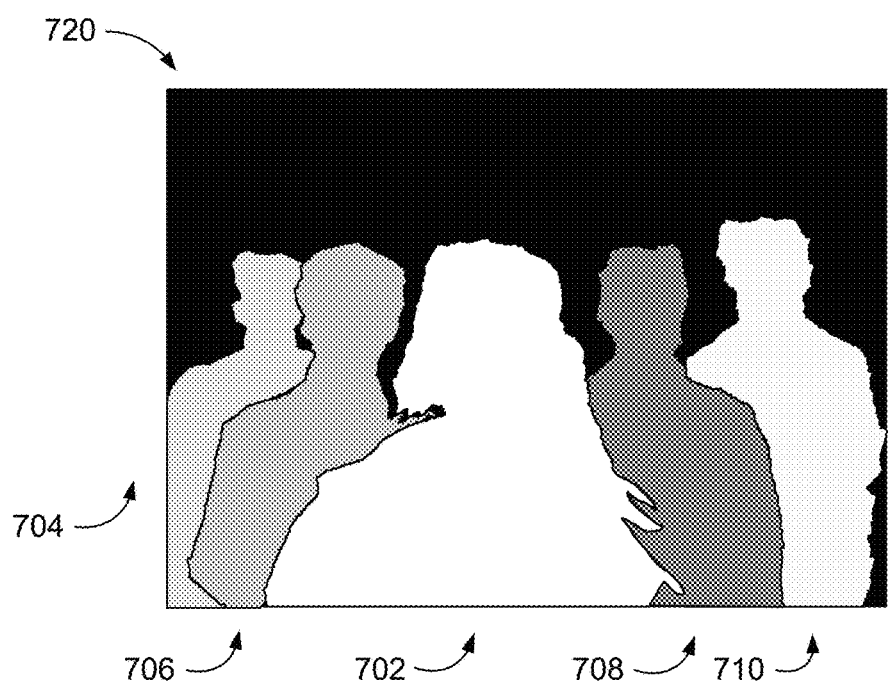
Figure 7C:
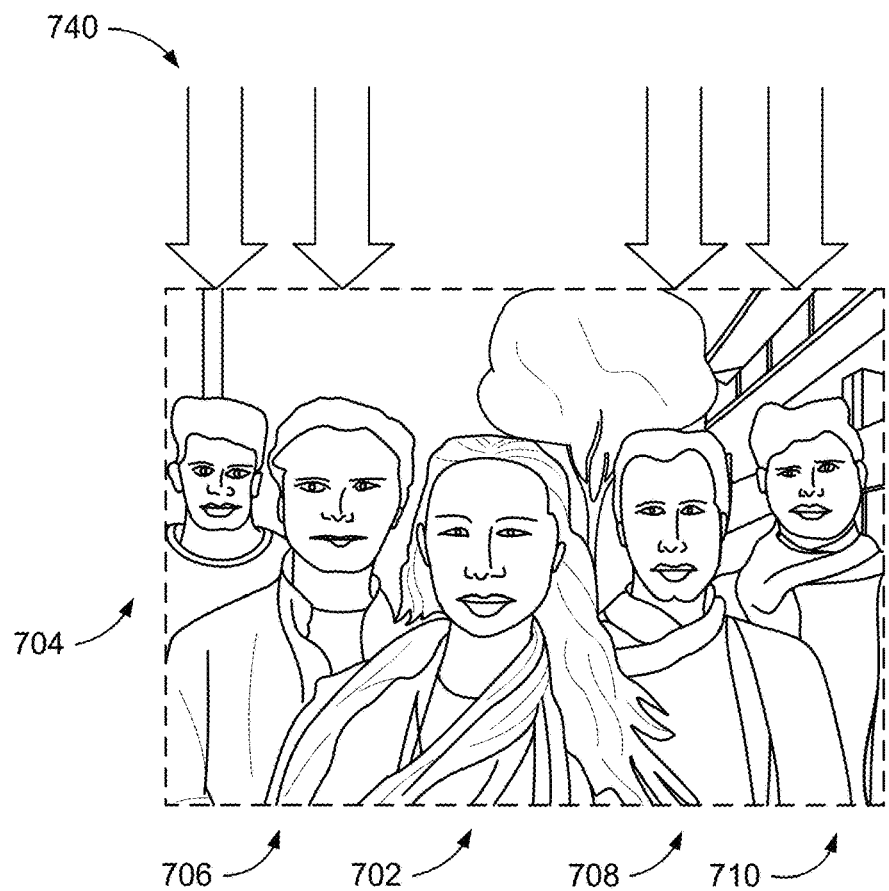
Figure 7D:
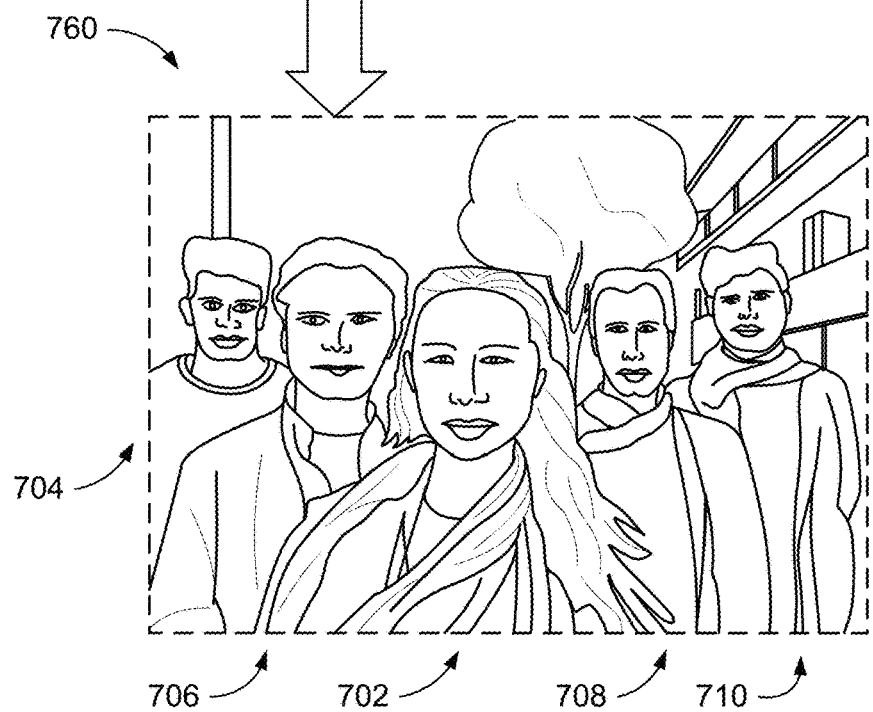
Figure 7E:
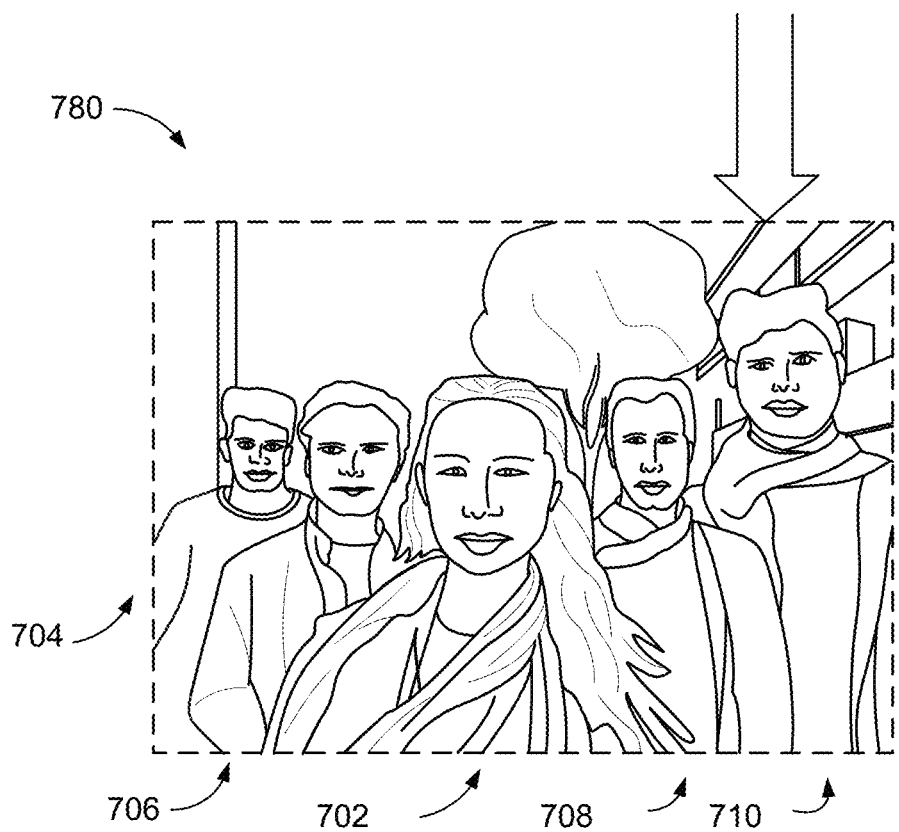

FIG. 7A through FIG. 7E provide additional illustrative example of image adjustments that can be performed using the systems and techniques of the present disclosure. FIG. 7A illustrates a 2D input image 700 including a first person 702 in the foreground, and second person 704, third person 706, fourth person 708, and fifth person 710 behind the first person 702 by different distances. FIG. 7B illustrates an example instance segmentation 720 performed on the 2D input image 700, where each of the first person 702, second person 704, third person 706, fourth person 708, and fifth person 710 in the image is separately recognized. In one illustrative example each person 702 through 710 is classified as a separate instance of the class "person" as illustrated by the different shading shown in FIG. 7B. In the first adjusted image 740 shown in FIG. 7C, each of the second, third, fourth and fifth person 704 through 710 have been adjusted using an image adjustment technique as described herein. For example, a 3D mesh corresponding to the 2D input image 700 was generated using depth information included in an RGB-D input image. In the illustrated example of FIG. 7C, the positions (e.g., vertices) corresponding to the second, third, fourth, and fifth person 704 through 710 were adjusted in the 3D mesh to be closer to the camera, and the adjusted 3D mesh was reprojected into 2D to generate the first adjusted image 740. Similarly, as shown in FIG. 7D, second adjusted image 760 illustrates an example where only the third person 706 has their position adjusted closer to the camera and third adjusted image 780 shown in FIG. 7E illustrates an example where only the fifth person has their position adjusted closer to the camera. In some cases, the positions of the second, third, fourth, and fifth person 704 through 710 can be dynamically moved backward and forward in the adjusted image based on a user input. In all of the examples shown in FIG. 7A and FIG. 7C through FIG. 7E, the first person 702 in the foreground remains fixed. In the example 3D mesh generated based on the 2D input image 700, the vertices associated with the person 702 may have been included in a non-adjustment portion and/or non-adjustment mesh as described above with respect to 3D mesh engine 406 of FIG. 4. FIG. 7A through FIG. 7E illustrate the flexibility of the systems and techniques for image adjustment described herein. For example, the systems and techniques allow for adjustment of ROI(s) or objects in a captured image while maintaining other ROI(s) or objects in the image fixed.

Figure 8:
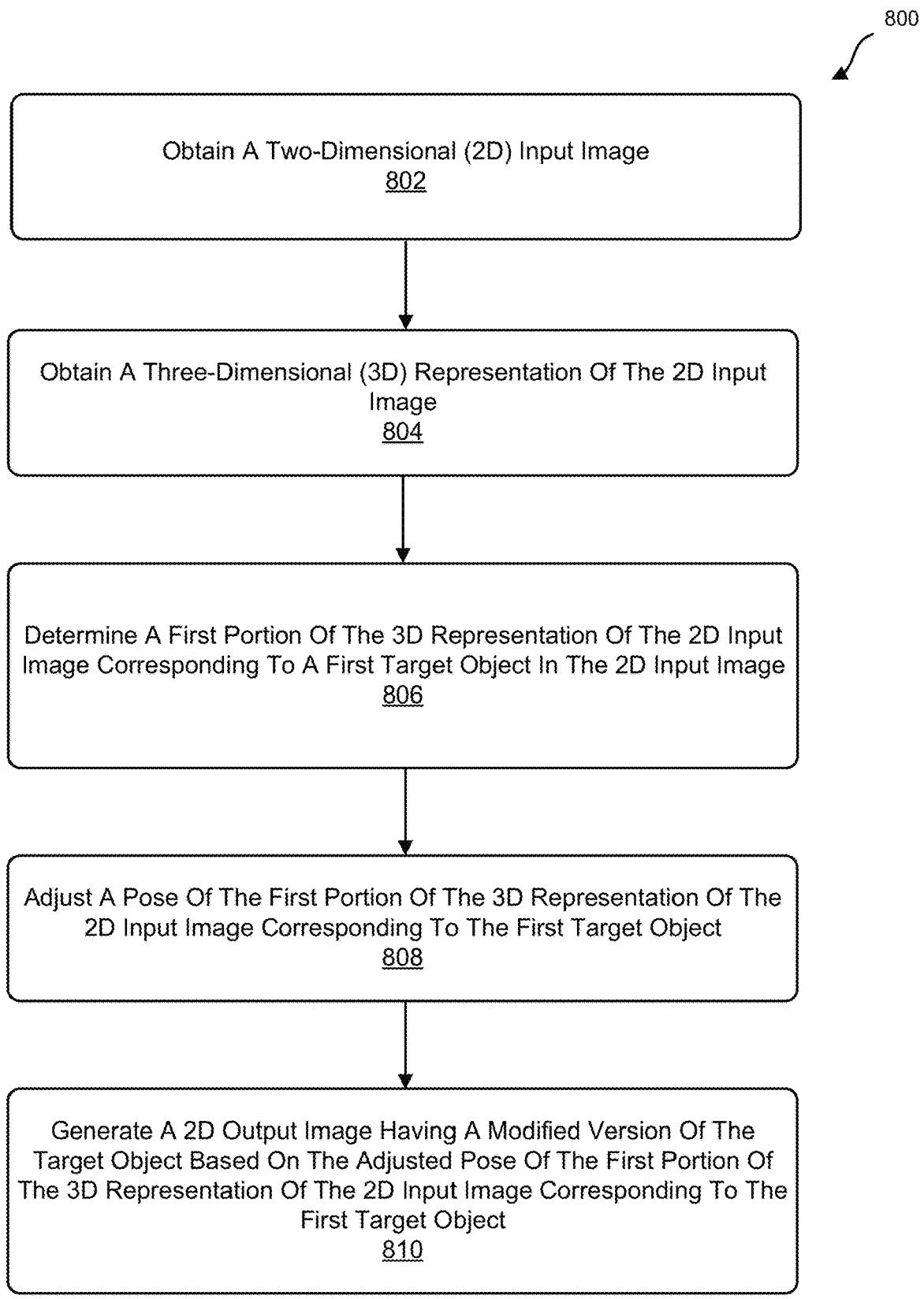
FIG. 8 is a flow diagram illustrating an example of a process for processing one or more images, in accordance with some examples.

FIG. 8 is a flow diagram illustrating an example of a process 800 of processing one or more frames. At block 802, the process 800 includes obtaining a 2D input image from a camera. For example, the 2D input image can be obtained from the image capture and processing system 300, the image capture device 305A, and/or the image processing device 305B.

At block 804, the process 800 includes obtaining a 3D representation of the 2D input image. For example, the process 800 can obtain a 3D representation from the 3D mesh engine 406 shown in FIG. 4.

At block 806, the process 800 includes determining a first portion of the 3D representation of the 2D input image corresponding to a first target object in the 2D input image. For example, the process 800 can obtain a user input indicating a target object and/or ROI. In some cases, based on the user input, the process 800 can determine vertices in the 3D mesh associated with the target object and/or ROI. In some cases, determining the first portion of the 3D representation of the 2D input image comprises at least one of feature detection and object detection. In some examples, determining the first portion of the 3D representation of the 2D input image is based on depth information corresponding to the first portion of the 3D representation of the 2D input image.

At block 808, the process 800 includes adjusting a pose of the first portion of the 3D representation of the 2D input image corresponding to the first target object. In some examples, adjusting the pose of the first portion of the 3D representation of the 2D input image corresponding to the target object includes decreasing depth values of first one or more vertices of the first portion of the 3D representation of the 2D input image corresponding to the target object. In some cases, adjusting the pose of the first portion of the 3D representation of the 2D input image includes one or more of adjusting depth, vertical shifting, horizontal shifting, pitch rotation, yaw rotation, and roll rotation. For example, the target object may be a person, and a modification of the 3D representation of the person can include changing an orientation of the person's head (e.g., rotation about the pitch axis, yaw axis, and/or roll axis). In some examples, adjusting the pose of the first portion of the 3D representation of the 2D input image corresponding to the target object further comprises increasing depth values of second one or more vertices of the first portion of the 3D representation of the 2D input image.

At block 810, the process 800 includes generating a 2D output image having a modified version of the target object based on the adjusted pose of the first portion of the 3D representation of the 2D input image corresponding to the target object to be output on a display. at least a sub-portion of the modified version of the target object has an enlarged size in the 2D output image relative to a corresponding sub-portion of the target object in the 2D input image.

In some examples, the process 800 includes obtaining a user input identifying the target object, wherein the pose of the first portion of the 3D representation of the 2D input image corresponding to the target object is adjusted based on the user input.

In some examples, the process 800 includes obtaining an indication of amount of adjustment of the target object and adjusting the pose of the 3D representation of the 2D input image by an amount corresponding to the indication of amount of adjustment of the target object.

In some examples, the process 800 includes obtaining an object mask associated with the target object in the 2D input image. In some cases, the process 800 includes determining, based on the object mask, the first portion of the 3D representation of the 2D input image corresponding to the target object. In some examples, the process 800 includes determining, based on the object mask, a second portion of the 3D representation corresponding to one or more additional objects. In some aspects, the process 800 includes combining the first portion of the 3D representation having the adjusted pose and the second portion of the 3D representation to generate a combined 3D mesh. In some cases, generating the 2D output image includes converting the combined 3D mesh to the 2D output image.

In some examples, the process 800 includes obtaining an object mask associated with one or more additional objects, different from the target object, in the 2D input image. In some aspects, the process 800 includes determining, based on the object mask, the first portion of the 3D representation of the 2D input image corresponding to the target object. In some cases, the process 800 includes determining, based on the object mask, a second portion of the 3D representation corresponding to at least one of the one or more additional objects. In some examples, the process 800 includes adjusting the pose of the first portion of the 3D representation and fixing one or more vertices of the second portion of the 3D representation to generate an adjusted 3D mesh. In some cases, adjusting the pose of the first portion of the 3D representation of the 2D input image corresponding to the target object includes decreasing depth values of vertices of the first portion of the 3D representation of the 2D input image corresponding to the target object such that the vertices have a pre-determined numerical correspondence relative to the fixed one or more vertices of the second portion of the 3D representation. In some aspects, generating the 2D output image includes converting the adjusted 3D mesh to the 2D output image.

In some cases, the pose of the first portion of the 3D representation of the 2D input image is adjusted by an amount determined based on a user input. In some aspects, the pose of the first portion of the 3D representation of the 2D input image is adjusted with an amount determined based on a default configuration. In some examples, the pose of the first portion of the 3D representation of the 2D input image is adjusted based on a machine learning of user's preference and past behaviors. In some implementations, a modification of at least a portion of the modified version of the target object includes one or more of vertical shifting, horizontal shifting, pitch rotation, yaw rotation, or roll rotation relative to a corresponding sub-portion of the target object in the 2D input image.

In some examples, the process 800 includes adjusting the pose of the first portion of the 3D representation of the 2D input image without adjusting a second portion of the 3D representation of the 2D input image not corresponding to the target object.

In some examples, the process 800 includes determining a second portion of the 3D representation of the 2D input image corresponding to a second target object in the 2D input image. In some case, the process 800 includes adjusting a pose of the second portion of the 3D representation of the 2D input image corresponding to the second target object. In some aspects, the process 800 includes generating the 2D output image further based on the adjusted pose of the second portion of the 3D representation of the 2D input image corresponding to the second target object. In some implementations, the adjustment to the pose of the second portion is different from the adjustment to the pose of the first portion.

In some examples, the process 800 includes obtaining a second 2D input image from a camera, wherein the second 2D input image includes at least a portion of a scene included in the 2D input image. In some aspects, the process 800 includes obtaining a second 3D representation of the second 2D input image, wherein at least a portion of the 2D output image is generated based on the second 3D representation of the second 2D input image.

In some examples, the processes described herein (e.g., process 800 and/or other process described herein) may be performed by a computing device or apparatus. In one example, one or more of the processes can be performed by the image adjustment system 400 of FIG. 4. In another example, one or more of the processes can be performed by the computing system 1100 shown in FIG. 11. For instance, a computing device with the computing system 1100 shown in FIG. 11 can include the components of the image adjustment system 400 and can implement the operations of the process 600 of FIG. 6, process 800 of FIG. 8 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 600, the process 800 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 and process 800 illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600, process 800 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
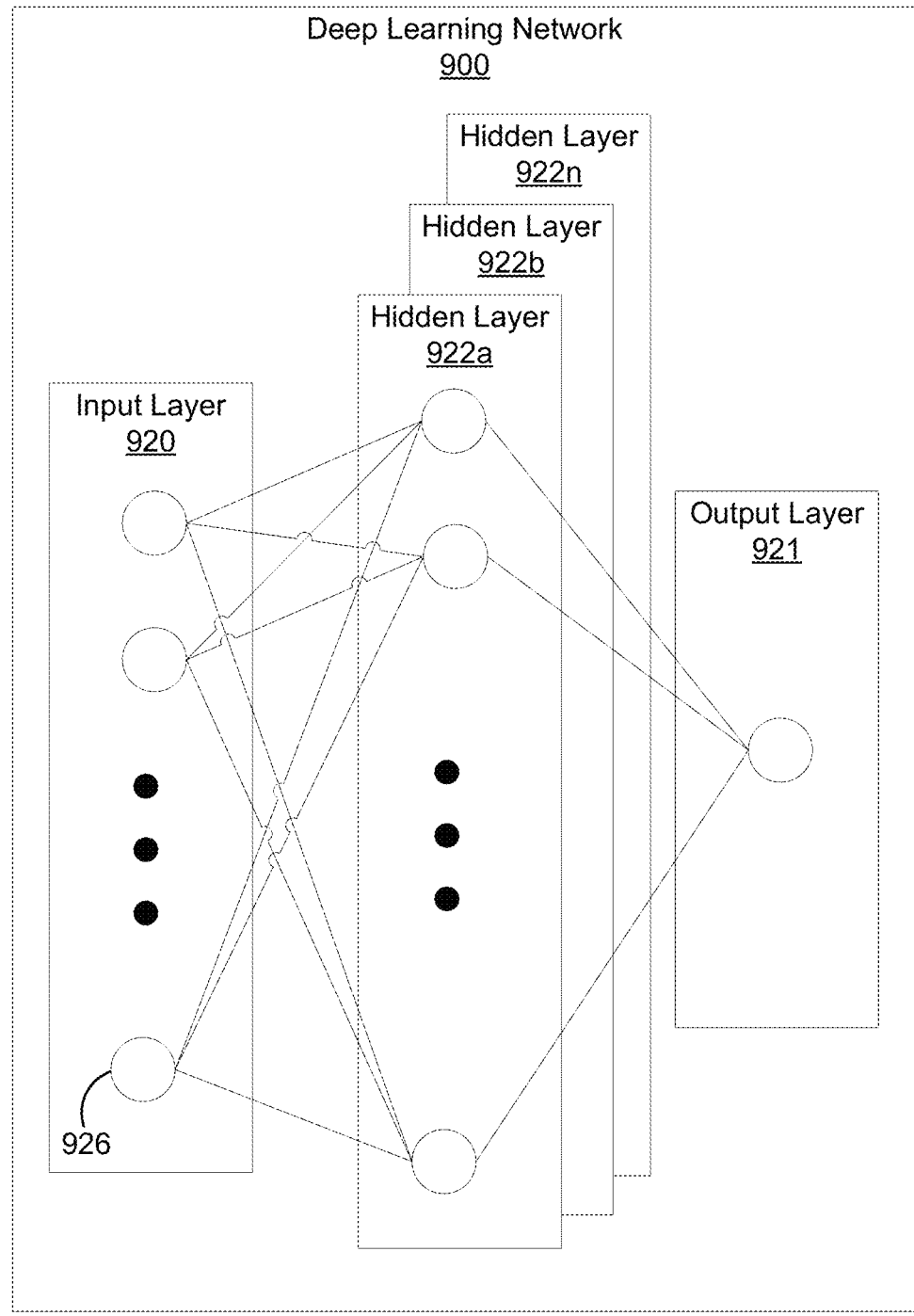
FIG. 9 is a block diagram illustrating an example of a deep learning network, in accordance with some examples.

As noted above, various aspects of the present disclosure can use machine learning models or systems. FIG. 9 is an illustrative example of a deep learning neural network 900 that can be used to implement the machine learning based feature segmentation, instance segmentation, depth estimation and/or classification described above. An input layer 920 includes input data. In one illustrative example, the input layer 920 can include data representing the pixels of an input image. The neural network 900 includes multiple hidden layers 922a, 922b, through 922n. The hidden layers 922a, 922b, through 922n include "n" number of hidden layers, where "n" is an integer greater than or equal to one. The number of hidden layers can be made to include as many layers as needed for the given application. The neural network 900 further includes an output layer 921 that provides an output resulting from the processing performed by the hidden layers 922a, 922b, through 922n. In one illustrative example, the output layer 921 can provide a classification for an object in a 2D input image. The classification can include a class identifying the type of activity (e.g., looking up, looking down, closing eyes, yawning, etc.).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922a. For example, as shown, each of the input nodes of the input layer 920 is connected to each of the nodes of the first hidden layer 922a. The nodes of the first hidden layer 922a can transform the information of each input node by applying activation functions to the input node information. The information derived from the transformation can then be passed to and can activate the nodes of the next hidden layer 922b, which can perform their own designated functions. Example functions include convolutional, up-sampling, data transformation, and/or any other suitable functions. The output of the hidden layer 922b can then activate nodes of the next hidden layer, and so on. The output of the last hidden layer 922n can activate one or more nodes of the output layer 921, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 921. In an example in which the neural network 900 is used to identify features in images, the neural network 900 can be trained using training data that includes both images and labels, as described above. For instance, training images can be input into the network, with each training image having a label indicating the features in the images (for the feature segmentation machine learning system) or a label indicating classes of an activity in each image. In one example using object classification for illustrative purposes, a training image can include an image of a number 2, in which case the label for the image can be [0 0 1 0 0 0 0 0 0 0].

In some cases, the neural network 900 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $\Sigma_{total}=\Sigma\frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW}$$

where w denotes a weight, $w_i$ denotes the initial weight, and η denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

Figure 10:
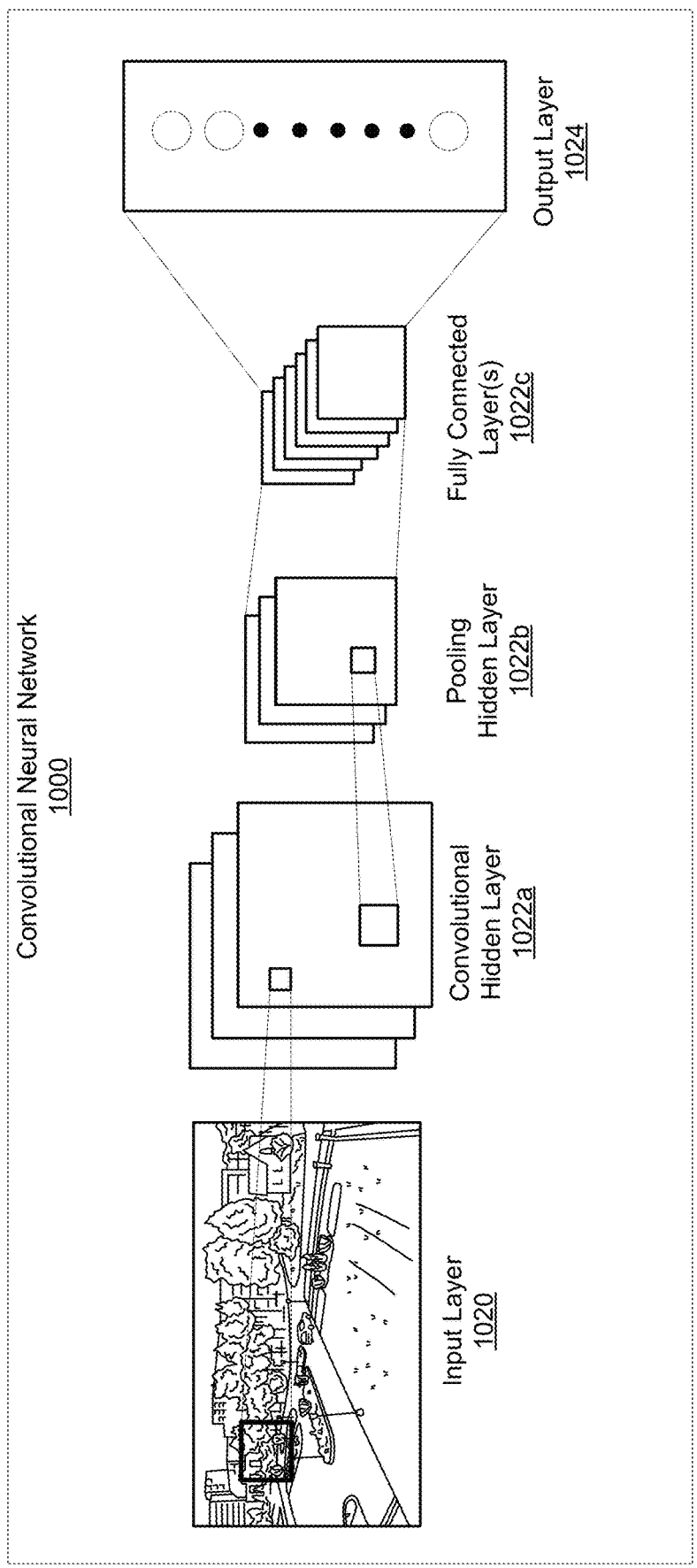
FIG. 10 is a block diagram illustrating an example of a convolutional neural network, in accordance with some examples.

FIG. 10 is an illustrative example of a convolutional neural network (CNN) 1000. The input layer 1020 of the CNN 1000 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022*a*, an optional non-linear activation layer, a pooling hidden layer 1022*b*, and fully connected hidden layers 1022*c* to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 is the convolutional hidden layer 1022*a*. The convolutional hidden layer 1022*a* analyzes the image data of the input layer 1020. Each node of the convolutional hidden layer 1022*a* is connected to a region of nodes (pixels) of the input image called a receptive field. The convolutional hidden layer 1022*a* can be considered as one or more filters (each filter corresponding to a different activation or feature map), with each convolutional iteration of a filter being a node or neuron of the convolutional hidden layer 1022*a*. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022*a*. Each connection between a node and a receptive field for that node learns a weight and, in some cases, an overall bias such that each node learns to analyze its particular local receptive field in the input image. Each node of the hidden layer 1022*a* will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1022*a* is due to each node of the convolutional layer being applied to its corresponding receptive field. For example, a filter of the convolutional hidden layer 1022*a* can begin in the top-left corner of the input image array and can convolve around the input image. As noted above, each convolutional iteration of the filter can be considered a node or neuron of the convolutional hidden layer 1022*a*. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022*a*. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022*a*.

The mapping from the input layer to the convolutional hidden layer 1022*a* is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1022*a* can include several activation maps in order to identify multiple features in an image. The example shown in FIG. 10 includes three activation maps. Using three activation maps, the convolutional hidden layer 1022*a* can detect three different kinds of features, with each feature being detectable across the entire image.

In some examples, a non-linear hidden layer can be applied after the convolutional hidden layer 1022*a*. The non-linear layer can be used to introduce non-linearity to a system that has been computing linear operations. One illustrative example of a non-linear layer is a rectified linear unit (ReLU) layer. A ReLU layer can apply the function $f(x)=\max(0; x)$ to all of the values in the input volume, which changes all the negative activations to 0. The ReLU can thus increase the non-linear properties of the CNN 1000 without affecting the receptive fields of the convolutional hidden layer 1022*a*.

The pooling hidden layer 1022*b* can be applied after the convolutional hidden layer 1022*a* (and after the non-linear hidden layer when used). The pooling hidden layer 1022*b* is used to simplify the information in the output from the convolutional hidden layer 1022*a*. For example, the pooling hidden layer 1022*b* can take each activation map output from the convolutional hidden layer 1022*a* and generates a condensed activation map (or feature map) using a pooling function. Max-pooling is one example of a function performed by a pooling hidden layer. Other forms of pooling functions be used by the pooling hidden layer 1022*a*, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022*a*. In the example shown in FIG. 10, three pooling filters are used for the three activation maps in the convolutional hidden layer 1022a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1022b to every one of the output nodes in the output layer 1024. Using the example above, the input layer includes 28×28 nodes encoding the pixel intensities of the input image, the convolutional hidden layer 1022a includes 3×24×24 hidden feature nodes based on application of a 5×5 local receptive field (for the filters) to three activation maps, and the pooling hidden layer 1022b includes a layer of 3×12×12 hidden feature nodes based on application of max-pooling filter to 2×2 regions across each of the three feature maps. Extending this example, the output layer 1024 can include ten output nodes. In such an example, every node of the 3×12×12 pooling hidden layer 1022b is connected to every node of the output layer 1024.

The fully connected layer 1022c can obtain the output of the previous pooling hidden layer 1022b (which should represent the activation maps of high-level features) and determines the features that most correlate to a particular class. For example, the fully connected layer 1022c layer can determine the high-level features that most strongly correlate to a particular class, and can include weights (nodes) for the high-level features. A product can be computed between the weights of the fully connected layer 1022c and the pooling hidden layer 1022b to obtain probabilities for the different classes. For example, if the CNN 1000 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1024 can include an M-dimensional vector (in the prior example, M=10). M indicates the number of classes that the CNN 1000 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 11:
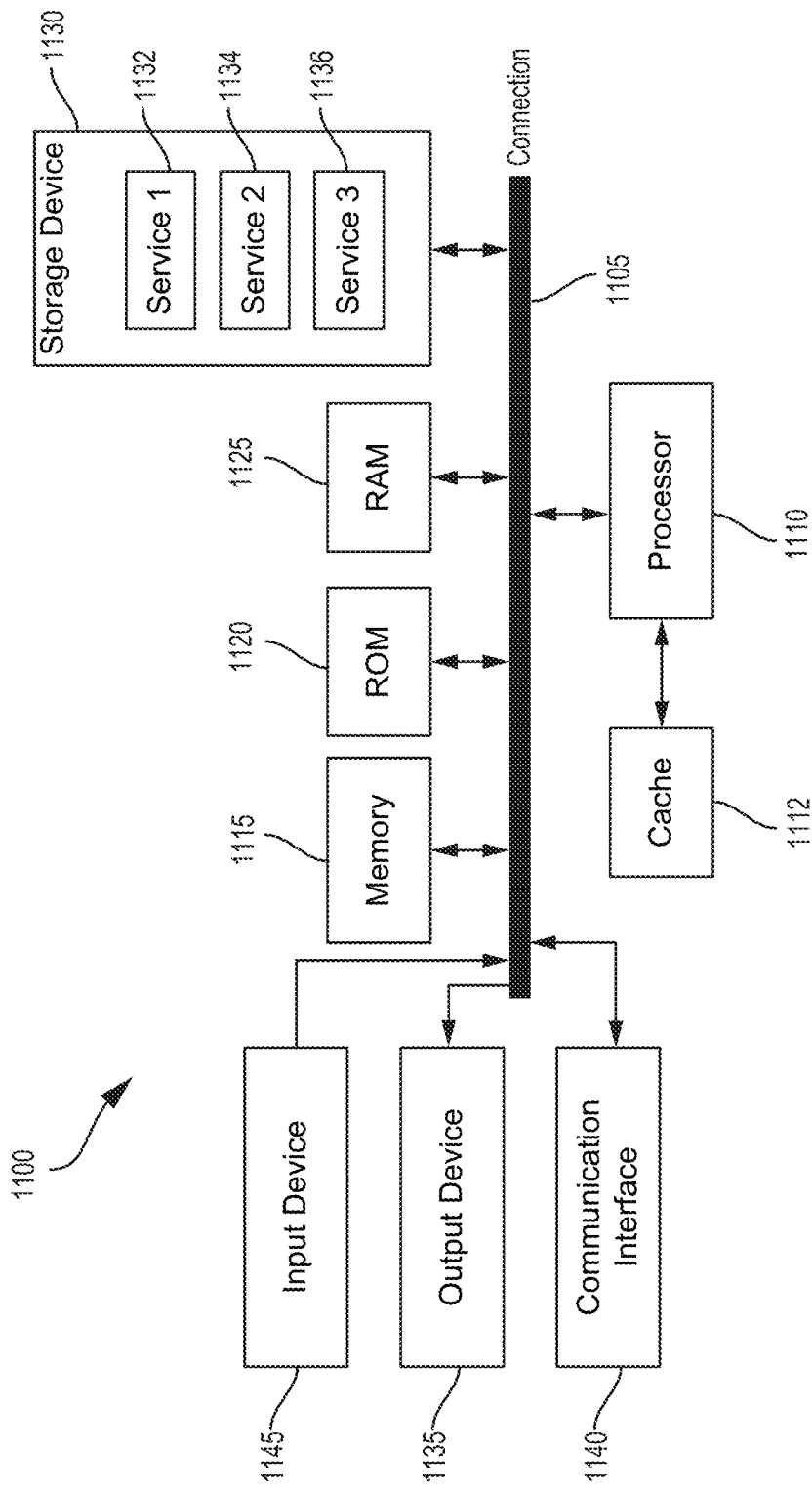
FIG. 11 is a diagram illustrating an example of a computing system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to (" ") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM)

such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of processing one or more images, comprising: obtaining a two-dimensional (2D) input image from a camera; obtaining a three-dimensional (3D) representation of the 2D input image; determining a first portion of the 3D representation of the 2D input image corresponding to a target object in the 2D input image; adjusting a pose of the first portion of the 3D representation of the 2D input image corresponding to the target object; and generating a 2D output image having a modified version of the target object based on the adjusted pose of the first portion of the 3D representation of the 2D input image corresponding to the target object to be output on a display.

Aspect 2: The method of Aspect 1, wherein at least a sub-portion of the modified version of the target object has an enlarged size in the 2D output image relative to a corresponding sub-portion of the target object in the 2D input image.

Aspect 3: The method of any of Aspects 1 to 2, wherein adjusting the pose of the first portion of the 3D representation of the 2D input image includes one or more of adjusting depth, vertical shifting, horizontal shifting, pitch rotation, yaw rotation, and roll rotation.

Aspect 4: The method of any of Aspects 1 to 3, wherein adjusting the pose of the first portion of the 3D representation of the 2D input image corresponding to the comprises: decreasing depth values of first one or more vertices of the first portion of the 3D representation of the 2D input image corresponding to the target object.

Aspect 5: The method of Aspect 4, wherein adjusting the pose of the first portion of the 3D representation of the 2D input image corresponding to the target object further comprises increasing depth values of second one or more vertices of the first portion of the 3D representation of the 2D input image.

Aspect 6: The method of any of Aspects 1 to 5, further comprising: obtaining a user input identifying the target object; wherein the pose of the first portion of the 3D representation of the 2D input image corresponding to the target object is adjusted based on the user input.

Aspect 7: The method of Aspect 6, further comprising: obtaining an indication of amount of adjustment of the target object; and adjusting the pose of the 3D representation of the 2D input image by an amount corresponding to the indication of the amount of adjustment of the target object.

Aspect 8: The method of any of Aspects 6 to 7, further comprising: determining an amount of adjustment of the target object based on one or more of an adjustment range, an apparent size change, and a maximum amount of distortion; and adjusting the pose of the 3D representation of the 2D input image by an amount corresponding to the amount of adjustment of the target object.

Aspect 9: The method of any of Aspects 6 to 8, further comprising: obtaining an object mask associated with the target object in the 2D input image; determining, based on the object mask, the first portion of the 3D representation of the 2D input image corresponding to the target object; determining, based on the object mask, a second portion of the 3D representation corresponding to one or more additional objects; and combining the first portion of the 3D representation having the adjusted pose and the second portion of the 3D representation to generate a combined 3D mesh.

Aspect 10: The method of Aspect 9, wherein generating the 2D output image includes converting the combined 3D mesh to the 2D output image.

Aspect 11: The method of any of Aspects 1 to 10, further comprising: obtaining an object mask associated with one or more additional objects, different from the target object, in the 2D input image; determining, based on the object mask, the first portion of the 3D representation of the 2D input image corresponding to the target object; determining, based on the object mask, a second portion of the 3D representation corresponding to at least one of the one or more additional objects; and adjusting the pose of the first portion of the 3D representation and fixing one or more vertices of the second portion of the 3D representation to generate an adjusted 3D mesh.

Aspect 12: The method of Aspect 11, wherein adjusting the pose of the first portion of the 3D representation of the 2D input image corresponding to the target object comprises: decreasing depth values of vertices of the first portion of the 3D representation of the 2D input image corresponding to the target object such that the vertices have a pre-determined numerical correspondence relative to the fixed one or more vertices of the second portion of the 3D representation.

Aspect 13: The method of any of Aspects 1 to 12, wherein generating the 2D output image includes converting the adjusted 3D mesh to the 2D output image.

Aspect 14: The method of any of Aspects 1 to 13, wherein determining the first portion of the 3D representation of the 2D input image comprises at least one of feature detection and object detection.

Aspect 15: The method of any of Aspects 1 to 14, wherein determining the first portion of the 3D representation of the 2D input image is based on depth information corresponding to the first portion of the 3D representation of the 2D input image.

Aspect 16: The method of any of Aspects 1 to 15, further comprising: adjusting the pose of the first portion of the 3D representation of the 2D input image without adjusting a second portion of the 3D representation of the 2D input image not corresponding to the target object.

Aspect 17: The method of any of Aspects 1 to 16, wherein the pose of the first portion of the 3D representation of the 2D input image is adjusted by an amount determined based on a user input.

Aspect 18: The method of any of Aspects 1 to 17, wherein the pose of the first portion of the 3D representation of the 2D input image is adjusted with an amount determined based on a default configuration.

Aspect 19: The method of any of Aspects 1 to 18, wherein the pose of the first portion of the 3D representation of the 2D input image is adjusted based on a machine learning of user's preference and past behaviors.

Aspect 20: The method of any of Aspects 1 to 19, further comprising: determining a second portion of the 3D representation of the 2D input image corresponding to a second target object in the 2D input image; adjusting a pose of the second portion of the 3D representation of the 2D input image corresponding to the second target object; and generating the 2D output image further based on the adjusted pose of the second portion of the 3D representation of the 2D input image corresponding to the second target object.

Aspect 21: The method of any of Aspect 20, wherein the adjustment to the pose of the second portion is different from the adjustment to the pose of the first portion.

Aspect 22: The method of any of Aspects 1 to 21, wherein a modification of at least a portion of the modified version of the target object includes one or more of vertical shifting, horizontal shifting, pitch rotation, yaw rotation, or roll rotation relative to a corresponding sub-portion of the target object in the 2D input image.

Aspect 23: The method of any of Aspects 1 to 22, further comprising: obtaining a second 2D input image from a camera, wherein the second 2D input image includes at least a portion of a scene included in the 2D input image; and obtaining a second 3D representation of the second 2D input image, wherein at least a portion of the 2D output image is generated based on the second 3D representation of the second 2D input image.

Aspect 24: An apparatus for processing one or more images, comprising: a memory; and one or more processors coupled to the memory and configured to: obtain a two-dimensional (2D) input image from a camera, obtain a three-dimensional (3D) representation of the 2D input image, determine a first portion of the 3D representation of the 2D input image corresponding to a target object in the 2D input image, adjust a pose of the first portion of the 3D representation of the 2D input image corresponding to the target object, and generate a 2D output image having a modified version of the target object based on the adjusted pose of the first portion of the 3D representation of the 2D input image corresponding to the target object to be output on a display.

Aspect 25: The apparatus of Aspect 24, wherein at least a sub-portion of the modified version of the target object has an enlarged size in the 2D output image relative to a corresponding sub-portion of the target object in the 2D input image.

Aspect 26: The apparatus of any of Aspects 24 to 25, wherein adjusting the pose of the first portion of the 3D representation of the 2D input image includes one or more of adjusting depth, vertical shifting, horizontal shifting, pitch rotation, yaw rotation, and roll rotation.

Aspect 27: The apparatus of any of Aspects 24 to 26, wherein the one or more processors are configured to: decrease depth values of first one or more vertices of the first portion of the 3D representation of the 2D input image corresponding to the target object.

Aspect 28: The apparatus of Aspect 27, wherein adjusting the pose of the first portion of the 3D representation of the 2D input image corresponding to the target object further comprises increasing depth values of second one or more vertices of the first portion of the 3D representation of the 2D input image.

Aspect 29: The apparatus of any of Aspects 24 to 28, wherein the one or more processors are configured to: obtain a user input identifying the target object; and the pose of the first portion of the 3D representation of the 2D input image corresponding to the target object is adjusted based on the user input.

Aspect 30: The apparatus of Aspect 29, wherein the one or more processors are configured to: obtain an indication of amount of adjustment of the target object; and adjust the pose of the 3D representation of the 2D input image by an amount corresponding to the indication of the amount of adjustment of the target object.

Aspect 31: The apparatus of any of Aspects 29 to 30, wherein the one or more processors are configured to: determine an amount of adjustment of the target object, based on one or more of an adjustment range, an apparent size change, and a maximum amount of distortion; and adjust the pose of the 3D representation of the 2D input image by an amount corresponding to the amount of adjustment of the target object.

Aspect 32: The apparatus of any of Aspects 29 to 31, wherein the one or more processors are configured to: obtain an object mask associated with the target object in the 2D input image; determine, based on the object mask, the first portion of the 3D representation of the 2D input image corresponding to the target object; determine, based on the object mask, a second portion of the 3D representation corresponding to one or more additional objects; and combine the first portion of the 3D representation having the adjusted pose and the second portion of the 3D representation to generate a combined 3D mesh.

Aspect 33: The apparatus of any of Aspects 24 to 32, wherein generating the 2D output image includes converting the combined 3D mesh to the 2D output image.

Aspect 34: The apparatus of any of Aspects 24 to 33, wherein the one or more processors are configured to: obtain an object mask associated with one or more additional objects, different from the target object, in the 2D input image; determine, based on the object mask, the first portion of the 3D representation of the 2D input image corresponding to the target object; determine, based on the object mask, a second portion of the 3D representation corresponding to at least one of the one or more additional objects; and adjust the pose of the first portion of the 3D representation and fix one or more vertices of the second portion of the 3D representation to generate an adjusted 3D mesh.

Aspect 35: The apparatus of Aspect 34, wherein, to adjust the pose of the first portion of the 3D representation of the 2D input image corresponding to the target object, the one or more processors are configured to: decrease depth values of vertices of the first portion of the 3D representation of the 2D input image corresponding to the 2D input image such that the vertices have a pre-determined numerical correspondence relative to the fixed one or more vertices of the second portion of the 3D representation.

Aspect 36: The apparatus of any of Aspects 34 to 35, wherein generating the 2D output image includes converting the adjusted 3D mesh to the 2D output image.

Aspect 37: The apparatus of any of Aspects 24 to 36, wherein determining the first portion of the 3D representation of the 2D input image comprises at least one of feature detection and object detection.

Aspect 38: The apparatus of any of Aspects 24 to 37, wherein determining the first portion of the 3D representation of the 2D input image is based on depth information corresponding to the first portion of the 3D representation of the 2D input image.

Aspect 39: The apparatus of any of Aspects 24 to 38, wherein the one or more processors are configured to: adjust the pose of the first portion of the 3D representation of the 2D input image without adjust a second portion of the 3D representation of the 2D input image not corresponding to the target object.

Aspect 40: The apparatus of any of Aspects 24 to 39, wherein the pose of the first portion of the 3D representation of the 2D input image is adjusted by an amount determined based on a user input.

Aspect 41: The apparatus of any of Aspects 24 to 40, wherein the pose of the first portion of the 3D representation of the 2D input image is adjusted with an amount determined based on a default configuration.

Aspect 42: The apparatus of any of Aspects 24 to 41, wherein the pose of the first portion of the 3D representation of the 2D input image is adjusted based on a machine learning of user's preference and past behaviors.

Aspect 43: The apparatus of any of Aspects 24 to 42, wherein the one or more processors are configured to: determine a second portion of the 3D representation of the 2D input image corresponding to a second target object in the 2D input image; adjust a pose of the second portion of the 3D representation of the 2D input image corresponding to the second target object; and generate the 2D output image further based on the adjusted pose of the second portion of the 3D representation of the 2D input image corresponding to the second target object.

Aspect 44: The apparatus of Aspect 43, wherein the adjustment to the pose of the second portion is different from the adjustment to the pose of the first portion.

Aspect 45: The apparatus of any of Aspects 24 to 44, wherein a modification of at least a portion of the modified version of the target object includes one or more of vertical shifting, horizontal shifting, pitch rotation, yaw rotation, or roll rotation relative to a corresponding sub-portion of the target object in the 2D input image.

Aspect 46: The apparatus of any of Aspects 24 to 45, wherein the one or more processors are configured to: obtain a second 2D input image from a camera, wherein the second 2D input image includes at least a portion of a scene included in the 2D input image; and obtain a second 3D representation of the second 2D input image, wherein at least a portion of the 2D output image is generated based on the second 3D representation of the second 2D input image.

Aspect 47: A non-transitory computer-readable storage medium having stored thereon instructions which, when executed by one or more processors, cause the one or more processors to perform any of the operations of aspects 1 to 46.

Aspect 48: An apparatus comprising means for performing any of the operations of aspects 1 to 46.

What is claimed is:

1. A method of processing one or more images, comprising:
    obtaining a two-dimensional (2D) input image from a camera;
    obtaining a three-dimensional (3D) representation of the 2D input image;
    determining a first portion of the 3D representation of the 2D input image corresponding to a target object in the 2D input image;
    obtaining an object mask associated with one or more additional objects, different from the target object, in the 2D input image, and wherein the determining the first portion of the 3D representation is based on the object mask;
    determining, based on the object mask, a second portion of the 3D representation corresponding to at least one of the one or more additional objects; and
    adjusting a pose of the first portion of the 3D representation and fixing one or more vertices of the second portion of the 3D representation to generate an adjusted 3D mesh;
    generating a 2D output image having a modified version of the target object based on the adjusted pose of the first portion of the 3D representation of the 2D input image corresponding to the target object to be output on a display.

2. The method of claim 1, wherein at least a sub-portion of the modified version of the target object has an enlarged size in the 2D output image with respect to a corresponding sub-portion of the target object in the 2D input image.

3. The method of claim 1, wherein adjusting the pose of the first portion of the 3D representation of the 2D input image includes one or more of adjusting depth, vertical shifting, horizontal shifting, pitch rotation, yaw rotation, and roll rotation.

4. The method of claim 1, wherein adjusting the pose of the first portion of the 3D representation of the 2D input image corresponding to the target object comprises:
    decreasing depth values of first one or more vertices of the first portion of the 3D representation of the 2D input image corresponding to the target object.

5. The method of claim 4, wherein adjusting the pose of the first portion of the 3D representation of the 2D input image corresponding to the target object further comprises increasing depth values of second one or more vertices of the first portion of the 3D representation of the 2D input image.

6. The method of claim 1, further comprising:
    obtaining a user input identifying the target object, wherein the pose of the first portion of the 3D representation of the 2D input image corresponding to the target object is adjusted based on the user input.

7. The method of claim 6, further comprising:
    obtaining an indication of amount of adjustment of the target object; and
    adjusting the pose of the 3D representation of the 2D input image by an amount corresponding to the indication of amount of adjustment of the target object.

8. The method of claim 6, further comprising:
  determining an amount of adjustment of the target object, based on one or more of an adjustment range, an apparent size change, and a maximum amount of distortion; and
  adjusting the pose of the 3D representation of the 2D input image by an amount corresponding to the amount of adjustment of the target object.

9. The method of claim 1, further comprising:
  obtaining an object mask associated with the target object in the 2D input image;
  determining, based on the object mask, the first portion of the 3D representation of the 2D input image corresponding to the target object;
  determining, based on the object mask, a second portion of the 3D representation corresponding to one or more additional objects; and
  combining the first portion of the 3D representation having the adjusted pose and the second portion of the 3D representation to generate a combined 3D mesh.

10. The method of claim 9, wherein generating the 2D output image includes converting the combined 3D mesh to the 2D output image.

11. The method of claim 1, wherein adjusting the pose of the first portion of the 3D representation of the 2D input image corresponding to the target object comprises:
  decreasing depth values of vertices of the first portion of the 3D representation of the 2D input image corresponding to the target object such that the vertices have a pre-determined numerical correspondence with respect to the fixed one or more vertices of the second portion of the 3D representation.

12. The method of claim 1, wherein generating the 2D output image includes converting the adjusted 3D mesh to the 2D output image.

13. The method of claim 1, wherein determining the first portion of the 3D representation of the 2D input image comprises at least one of feature detection and object detection.

14. The method of claim 1, wherein determining the first portion of the 3D representation of the 2D input image is based on depth information corresponding to the first portion of the 3D representation of the 2D input image.

15. An apparatus for processing one or more images, comprising:
  a memory; and
  one or more processors coupled to the memory and configured to:
    obtain a two-dimensional (2D) input image from a camera;
    obtain a three-dimensional (3D) representation of the 2D input image;
    determine a first portion of the 3D representation of the 2D input image corresponding to a target object in the 2D input image;
    obtain an object mask associated with one or more additional objects, different from the target object, in the 2D input image, wherein the first portion of the 3D representation is determined based on the object mask;
    determine, based on the object mask, a second portion of the 3D representation corresponding to at least one of the one or more additional objects;
    adjust a pose of the first portion of the 3D representation and fix one or more vertices of the second portion of the 3D representation to generate an adjusted 3D mesh; and
    generate a 2D output image having a modified version of the target object based on the adjusted pose of the first portion of the 3D representation of the 2D input image corresponding to the target object to be output on a display.

16. The apparatus of claim 15, wherein at least a sub-portion of the modified version of the target object has an enlarged size in the 2D output image with respect to a corresponding sub-portion of the target object in the 2D input image.

17. The apparatus of claim 15, wherein adjusting the pose of the first portion of the 3D representation of the 2D input image includes one or more of adjusting depth, vertical shifting, horizontal shifting, pitch rotation, yaw rotation, and roll rotation.

18. The apparatus of claim 15, wherein the one or more processors are configured to:
  decrease depth values of first one or more vertices of the first portion of the 3D representation of the 2D input image corresponding to the target object.

19. The apparatus of claim 18, wherein adjusting the pose of the first portion of the 3D representation of the 2D input image corresponding to the target object further comprises increasing depth values of second one or more vertices of the first portion of the 3D representation of the 2D input image.

20. The apparatus of claim 15, wherein the one or more processors are configured to obtain a user input identifying the target object, wherein the pose of the first portion of the 3D representation of the 2D input image corresponding to the target object is adjusted based on the user input.

21. The apparatus of claim 20, wherein the one or more processors are configured to:
  obtain an indication of amount of adjustment of the target object; and
  adjust the pose of the 3D representation of the 2D input image by an amount corresponding to the indication of amount of adjustment of the target object.

22. The apparatus of claim 20, wherein the one or more processors are configured to:
  determine an amount of adjustment of the target object, based on one or more of an adjustment range, an apparent size change, and a maximum amount of distortion; and
  adjust the pose of the 3D representation of the 2D input image by an amount corresponding to the amount of adjustment of the target object.

23. The apparatus of claim 15, wherein the one or more processors are configured to:
  obtain an object mask associated with the target object in the 2D input image;
  determine, based on the object mask, the first portion of the 3D representation of the 2D input image corresponding to the target object;
  determine, based on the object mask, a second portion of the 3D representation corresponding to one or more additional objects; and
  combine the first portion of the 3D representation having the adjusted pose and the second portion of the 3D representation to generate a combined 3D mesh.

24. The apparatus of claim 23, generating the 2D output image includes converting the combined 3D mesh to the 2D output image.

25. The apparatus of claim 16, wherein, to adjust the pose of the first portion of the 3D representation of the 2D input image corresponding to the target object, the one or more processors are configured to:

decrease depth values of vertices of the first portion of the 3D representation of the 2D input image corresponding to the 2D input image such that the vertices have a pre-determined numerical correspondence with respect to the fixed one or more vertices of the second portion of the 3D representation.

26. The apparatus of claim 16, wherein generating the 2D output image includes converting the adjusted 3D mesh to the 2D output image.

27. The apparatus of claim 15, wherein determining the first portion of the 3D representation of the 2D input image comprises at least one of feature detection and object detection.

28. The apparatus of claim 15, wherein determining the first portion of the 3D representation of the 2D input image is based on depth information corresponding to the first portion of the 3D representation of the 2D input image.

29. A method of processing one or more images, comprising:
- obtaining a two-dimensional (2D) input image from an image capture device;
- obtaining a three-dimensional (3D) representation of the 2D input image, the 3D representation of the 2D input image including a first portion corresponding to a target object in the 2D input image, and a second portion corresponding to at least one or more additional objects in the 2D input image;
- obtaining an object mask associated with one or more additional objects and determining the first portion and the second portion of the 3D representation based on the object mask;
- adjusting a pose of the first portion of the 3D representation and fixing one or more vertices of the second portion of the 3D representation to generate an adjusted 3D mesh; and
- generating a 2D output image having a modified version of the target object based on the adjusted pose of the first portion of the 3D representation of the 2D input image to be output on a display.

30. A method of processing one or more images, comprising:
- generating a three-dimensional (3D) representation of a 2D input image, the 3D representation of the 2D input image including a first portion corresponding to a target object in the 2D input image, and a second portion corresponding to at least one or more additional objects in the 2D input image;
- determining the first portion and the second portion of the 3D representation based on an object mask associated with one or more additional objects;
- adjusting a pose of the first portion of the 3D representation and fixing one or more vertices of the second portion of the 3D representation to generate an adjusted 3D mesh; and
- generating a 2D output image having a modified version of the target object based on the adjusted pose of the first portion of the 3D representation of the 2D input image to be output on a display.

* * * * *